United States Patent
Schneider

(10) Patent No.: US 6,886,390 B2
(45) Date of Patent: May 3, 2005

(54) DOUBLE-WALLED CONTAINMENT ENCLOSURE

(75) Inventor: William A. Schneider, Conroe, TX (US)

(73) Assignee: Containment Solutions, Inc., Conroe, TX (US)

(*) Notice: Subject to any disclaimer, the term of this patent is extended or adjusted under 35 U.S.C. 154(b) by 0 days.

(21) Appl. No.: 10/739,143

(22) Filed: Dec. 19, 2003

(65) Prior Publication Data

US 2004/0154381 A1 Aug. 12, 2004

Related U.S. Application Data

(60) Provisional application No. 60/446,512, filed on Feb. 12, 2003.

(51) Int. Cl.[7] .............................. G01M 3/04; B65B 1/30
(52) U.S. Cl. .............................. 73/49.2; 73/40; 73/49.3; 141/94
(58) Field of Search .............................. 73/49.3, 49.2, 73/40, 52; 141/94; 220/560.03

(56) References Cited

U.S. PATENT DOCUMENTS

| | | | |
|---|---|---|---|
| 3,214,963 A | * | 11/1965 | Reinier et al. ............... 73/49.2 |
| 4,639,164 A | | 1/1987 | Pugnale et al. |
| 4,932,257 A | | 6/1990 | Webb |
| 4,974,739 A | | 12/1990 | Gelin |
| 5,220,823 A | | 6/1993 | Berg et al. |
| 5,297,896 A | | 3/1994 | Webb |
| 5,462,191 A | | 10/1995 | Bartlow et al. |
| 5,595,456 A | | 1/1997 | Berg et al. |
| 5,664,696 A | * | 9/1997 | Canga ........................ 220/4.12 |
| 5,763,035 A | | 6/1998 | Andre De La Porte et al. |
| 5,803,304 A | | 9/1998 | Berg |
| 5,870,871 A | | 2/1999 | Stewart |
| 5,904,265 A | | 5/1999 | Zandbergen et al. |
| 6,171,029 B1 | | 1/2001 | McGill et al. |
| 6,220,081 B1 | * | 4/2001 | Kress ............................ 73/46 |
| 6,223,587 B1 | * | 5/2001 | Chiocca ....................... 73/49.6 |
| 2001/0002022 A1 | | 5/2001 | Steinbergs et al. |
| 2002/0175167 A1 | | 11/2002 | Berg |
| 2003/0033855 A1 | | 2/2003 | Manger et al. |
| 2003/0047211 A1 | | 3/2003 | Bravo et al. |
| 2003/0047212 A1 | | 3/2003 | Bravo et al. |

* cited by examiner

Primary Examiner—Michael Cygan
(74) Attorney, Agent, or Firm—Shaw Pittman LLP

(57) ABSTRACT

A containment enclosure system at least a portion of which is double-walled. An exemplary system of the invention provides enhanced leak protection by monitoring the space within the double-walled portion of the containment enclosure system. The system is capable of providing continuous monitoring of the enclosure, collar, penetrations, and/or joints for potential leaks. Containment enclosures of the invention may be used as, used with, or attached to tanks, piping, dispensers, or any other type of storage container including vessels, boxes, spheres or containers of any shape. These containment enclosures may be underground, partially underground, or aboveground. In addition, these containment enclosures may be completely enclosed or enclosed on the bottom and sides with an open or covered top. Where these containment enclosures are attached to a storage tank or other storage container, embodiments also include the associated apparatus for affixing the enclosures to the storage tank or other storage container.

12 Claims, 19 Drawing Sheets

DOUBLE-WALLED CONTAINMENT ENCLOSURE

This application claims the benefit of U.S. Provisional Application No. 60/446,512, filed Feb. 12, 2003, which is incorporated herein by reference in its entirety.

BACKGROUND OF THE INVENTION

1. Field of the Invention

Embodiments of the present invention relate to containment enclosures. More particularly, embodiments of the present invention relate to double-walled containment enclosures.

2. Background Information

Containment enclosures, sometimes called turbine enclosures or sumps, are currently used to provide a housing for various components, including, for example, a submersible pump, a termination point for double-wall piping, and/or access to fittings or accessories on the top of an underground tank. Containment enclosures may be constructed of fiberglass reinforced plastic (FRP), which is a proven material for long-term performance, or other materials such as polyethylene, polypropylene, other plastics, or combinations of these materials.

A typical containment enclosure is often supplied with non-sealed, watertight, or sealed FRP lids to block access to the interior of the containment enclosure. In a typical installation, a containment collar is affixed to the storage tank and has an adhesive channel opposite the portion mounted to the tank to allow for a sealed joint with the containment enclosure body. The containment enclosure body is typically a cylindrical or polygon shaped body that also includes an adhesive channel to allow for a sealed joint with a reducer or flat top. The reducer or flat top allows for the addition of a lid of the same diameter as the enclosure or for narrowing of the enclosure opening with a lid of a diameter less or equal to that of the enclosure body. As an alternative, the adhesive joints may be replaced with field applied FRP lay ups attaching the parts together.

Because of the materials contained in these storage tanks, for example gasoline or other hazardous liquids, more and more stringent regulations have led to the use of double-walled storage tanks to allow for extra protection from leaks as well as the ability to detect leaks. Although much of the focus has been on maintaining the integrity of the tank itself, as the need for safer and more reliable systems increases, it may become more desirable to have an entire system, tank and containment enclosure combined, with the safety and durability now embodied in the tank itself.

Similarly, underground containers are also used for holding and detecting fuel leaks under fuel dispensing pumps, for piping transitions, or for vapor recovery systems. These containers can also benefit by the use of containment enclosures for the same reasons as previously noted for tanks.

SUMMARY OF THE INVENTION

The present invention provides a containment enclosure system at least a portion of which is double-walled. Preferably, the entire containment enclosure is double-walled. An exemplary system of the invention provides enhanced leak protection by monitoring the space within the double-walled portion of the containment enclosure system. In addition, the exemplary system is preferably capable of providing continuous monitoring of the enclosure, collar, penetrations, and/or joints for potential leaks. Containment enclosures of the invention may be used as, used with, or attached to tanks, piping, dispensers, or any other type of storage container including vessels, boxes, spheres or containers of any shape. These containment enclosures may be underground, partially underground, or aboveground. In addition, as described below, these containment enclosures may be completely enclosed or enclosed on the bottom and sides with an open or covered top. Where these containment enclosures are attached to a storage tank or other storage container, embodiments also include the associated apparatus for affixing the enclosures to the storage tank or other storage container.

One embodiment of the invention provides a containment enclosure that includes a body, an access to the interior of the body, a shoulder located next to the access, a reservoir, and a sensor. The access is located near an upper extremity of the body. At least a portion of the body includes an inner wall and an outer wall. The inner wall and the outer wall define a body monitoring space. The body monitoring space preferably has an up-to-down orientation that extends from a top end of the body to a bottom end of the body. Preferably, the body monitoring space surrounds the entire body. The reservoir is in fluid communication with the body monitoring space. The reservoir is configured to supply a fluid to the body monitoring space. The sensor is disposed within the reservoir. The sensor is configured to monitor movement of the fluid within the body monitoring space.

The reservoir can be disposed within the body in one of several ways. For example, the reservoir can be disposed near the shoulder. In an embodiment in which the shoulder is located near the upper end of an upper extremity of the body, the reservoir is located near the upper end of the body to provide maximum monitoring of the body. The reservoir can be detachably attached to the body. Detachably attached to the body means the reservoir is a unit separable from the body. Alternatively, the reservoir can be fixedly attached to the body. Fixedly attached means that the reservoir is an integrated portion of the body. Preferably, the reservoir can be detachably or fixed attached to the shoulder. Alternatively, the reservoir can be detachably or fixedly attached to the inner wall.

Preferably, the fluid communication between the reservoir and the body monitoring space is facilitated by a hole or a connector. Alternatively, the fluid communication between the reservoir and the body monitoring space is facilitated by a hose.

In another embodiment, the containment enclosure further includes a lid. The lid is configured to block the access. The lid includes a lid monitoring space. The lid monitoring space may be in fluid communication with the body monitoring space or monitored independently. The reservoir is configured to supply the fluid to the lid monitoring space. Preferably, the reservoir can be detachably or fixedly attached to the lid. Preferably, the fluid communication between the lid monitoring space and the body monitoring space can be facilitated by a connector or a hose.

Preferably, the shoulder includes one or more of a vertical portion, a horizontal portion, and a slope portion.

Another embodiment of the containment enclosure of the invention includes two portions and a sensor. The first portion includes a first monitoring space. The first monitoring space is defined by an inner wall and an outer wall of the first portion. The second portion is configured to be coupled to the first portion. The second portion includes a second monitoring space. The second monitoring space is defined by an inner wall and an outer wall of the second portion. The second monitoring space is in fluid communication with the first monitoring space to form an integrated monitoring space. The sensor is configured to detect fluid movement in the integrated monitoring space. Preferably, a double flanged joint can be used to couple the second portion to the first portion.

Depending on the type of sensor used, the integrated monitoring space can include a vacuum or it can be pressurized. In still another implementation using a different sensor, the containment enclosure further includes a reservoir. The reservoir is in fluid communication with the integrated monitoring space. A fluid flows freely between the reservoir and the integrated monitoring space. Preferably, the fluid is a brine solution or another fluid.

Preferably, the containment enclosure can further include a third portion. The third portion has a third monitoring space. The third monitoring space is defined by an inner wall and an outer wall of the third portion. The third monitoring space is in fluid communication with the first monitoring space and the second monitoring space. In this embodiment, the integrated monitoring space includes the third monitoring space in addition to the first monitoring space and the second monitoring space. A first double flange joint can be used to couple the first portion to the second portion.

A second double flanged joint can be used to couple the third portion to the second portion.

In still another embodiment, the containment enclosure of the invention includes a collar portion, a top portion, a reservoir, and a sensor. The collar portion is configured to be attached to a vessel. The vessel can be, for example, an underground storage tank. The collar portion includes a collar monitoring space. The collar monitoring space is defined by an inner wall and an outer wall of the collar portion. The top portion is configured to be coupled to the collar portion. The top portion includes a top monitoring space. The top monitoring space is defined by an inner wall and an outer wall of the top portion. The top monitoring space is in fluid communication with the collar monitoring space to form an integrated monitoring space. The reservoir is in fluid communication with the integrated monitoring space. The sensor is configured to monitor fluid movement in the integrated monitoring space.

Preferably, the reservoir is located near an upper extremity of the top portion. Preferably, the top portion is coupled to the collar portion during field installation.

In an alternative implementation, the containment enclosure further includes an extension portion. The extension portion is configured to be coupled to the top portion and the collar portion, separating the top portion from the collar portion. The extension portion includes an extension monitoring space. The extension monitoring space is defined by an inner wall and an outer wall of the extension portion. The extension monitoring space is in fluid communication with the top monitoring space and the collar monitoring space. In this configuration, the integrated monitoring space includes the extension monitoring space in addition to the top monitoring space and the collar monitoring space. Preferably, the extension portion is coupled to the collar portion and the top portion during field installation.

In another embodiment, the present invention provides a containment enclosure for mounting to a tank or other vessel. The containment enclosure includes a collar portion, an extension portion, a top portion, a reservoir, a fluid, and a sensor. The collar portion has a collar monitoring space. The collar monitoring space is defined by an inner wall and an outer wall of the collar portion. The collar portion is configured to be coupled to the tank. The extension portion has an extension monitoring space. The extension monitoring space is defined by an inner wall and an outer wall of the extension portion. The extension portion is configured to be coupled to the collar portion. The top portion has a top monitoring space. The top monitoring space is defined by an inner wall and an outer wall of the top portion. The top portion is configured to be coupled to the extension portion. The reservoir is coupled to the top portion. The reservoir is in fluid communication with the top monitoring space, the extension monitoring space, and the collar monitoring space. The fluid flows freely within the reservoir, the top monitoring space, the extension monitoring space, and the collar monitoring space. The sensor is configured to monitor movement of the fluid in the reservoir, the top monitoring space, the extension monitoring space, and the collar monitoring space.

Preferably, the top portion can have a flat top shape or a conical top shape. Preferably, one or more of the top portion, the extension portion, and the collar portion have a round cross section. Alternatively, one or more of the top portion, the extension portion, and the collar portion can have a polygonal cross section, an elliptical cross section, or another cross section.

DETAILED DESCRIPTION OF THE INVENTION

Figure 1:
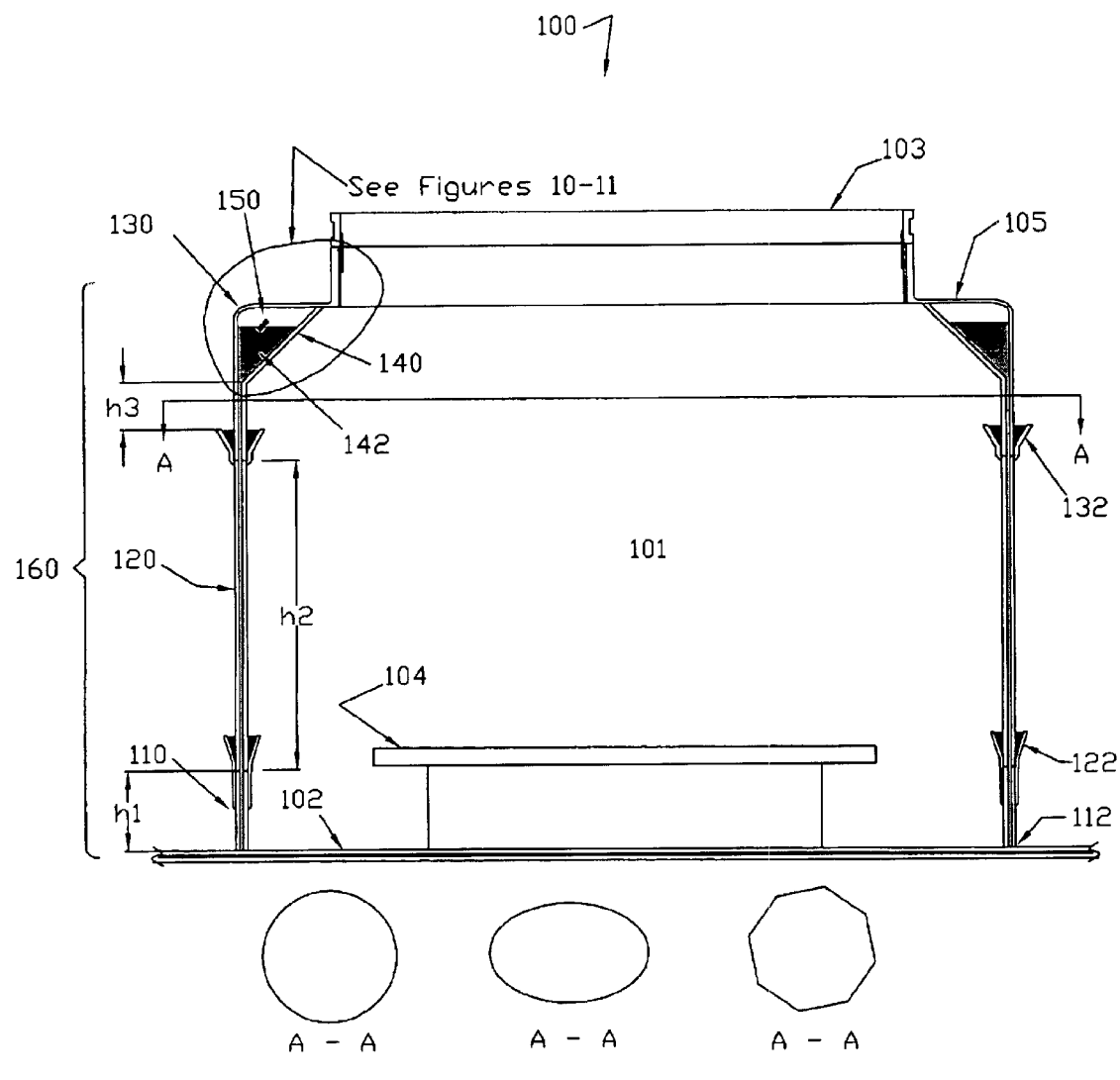
FIG. 1 is a cross-section view of an exemplary containment enclosure of the invention.

Some governmental regulatory agencies require double wall construction of underground storage tanks (UST). The double wall construction provides for the monitoring of a monitoring space for leaks in either the primary or the secondary wall (the inner and the outer walls) of the UST. The monitoring space is also known as the interstitial space or the annular space. Preferred embodiments of the present invention disclose the use of a sensor to monitor the monitoring space of a containment enclosure of the invention. The monitoring space of the invention may be dry, which can include a vacuum or be pressurized. Alternatively, the monitoring space may be filled with a sensing fluid. Specific embodiments are described herein to provide enabling description and best mode, but the scope of the invention is not limited to the specific embodiments.

A wet monitoring space offers simple sensing by relying upon the pressure head supplied by the sensing fluid to cause the sensing fluid to leak from the monitoring space if a leak is present in either the primary or the secondary walls. A sensor supplied and installed in the monitoring space detects a loss of the sensing fluid, which indicates the leak. Accordingly, by monitoring the pressure head of the sensing fluid, movement of the sensing fluid within the monitoring space (into or out of) can be determined. As a result, leak associated with one or more of the primary and secondary walls can be detected.

In certain embodiments of the invention, it is noted that a leak in one or both the primary or the secondary wall results in the sensor detecting a loss of the sensing fluid when the leak is at or below the sensor level. As a result, it is preferable that the monitoring space and/or sensor be extended as high as possible in the containment enclosure. Furthermore, it is preferable that the monitoring space be configured appropriately to accommodate the sensor. It is preferable that there be sufficient volume in the monitoring space at the level of the sensor to provide for level changes caused by expansion and contraction of the sensing fluid. The expansion and contraction can be affected by, for example, changes in temperature, internal pressure on the containment walls, and external pressure on the containment walls without causing the sensor to falsely indicate that one or more of the walls are leaking. It is preferable that the sensor and the sensing fluid be sized and positioned within the containment enclosure to accomplish the aforementioned objectives without interfering or creating obstacles to easy access of the primary space (or the interior) of the containment enclosure for piping and piping access.

If the containment enclosure includes a lid, the lid may also be secondarily contained with a similar monitoring space. The monitoring space of the lid may or may not be connected to the monitoring space of the body of the containment enclosure. If connected, the lid may include the reservoir. If not connected, the lid may include a second reservoir.

For embodiments of the present invention that are configured to be installed on an UST, it is preferable that the containment enclosure be configured to include a body. The body preferably includes one or more portions. As described below, preferred embodiments of the invention include a collar portion, a top portion, and an extension portion. Preferably, the collar portion of the containment enclosure is installed on the UST in a factory. The top portion and the extension portion are configured to be field installed to the collar portion. This allows for shipment of the UST and the containment enclosure without incurring costs associated with wide or tall loads. Preferably, each of the top portion, the extension portion, and the collar portion can be configured to have different heights to accommodate field conditions depending on, for example, depth of the UST, size of the containment enclosure, groundwater table, and other factors.

Preferably, the extension portion is coupled to the collar portion using a double flanged joint, which is described in Applicants' U.S. Provisional Application No. 60/446,512. Similarly, the top portion is coupled to the extension portion using another double flanged joint. If the extension portion is not used, then the top portion is coupled directly to the collar portion. The double flanged joint allows the three portions of the containment enclosure to be placed together and the flanged cavity filled with an adhesive or caulking suitable for exposure to the sensing fluid or any other fluid that may leak into or be otherwise found in the primary space of the containment enclosure or found outside the secondary enclosure. This method provides a field fabricated joint which maintains the monitoring space across the joint. In other words, different monitoring spaces associated with the collar portion, the extension portion, and the top portion can be combined and behave as an integrated monitoring space. As an alternative, the joints may be field applied lay ups on the interior and the exterior.

Similarly, it is preferable that piping transition boxes, dispenser sumps, or other vessels be field installable in the same manner using the same joining method.

FIG. 1 is a cross-section view of an exemplary containment enclosure of the invention. In this exemplary embodiment, containment enclosure 100 is configured to serve as a sump for an UST, depicted in FIG. 1 as tank 102. Containment enclosure 100 includes collar portion 110, extension portion 120, and top portion 130. As indicated in sections A—A, each of top portion 130, extension portion 120, and collar portion 110 can have a round, elliptical, polygonal shape, or other shape. Collar portion 110, extension portion 120, and top portion 130 may all be made of a material such as, for example, fiberglass reinforced plastic or of different materials.

One or more of top portion 130, extension portion 120, and collar portion 110 can be combined and be collectively known as body 160. Body 160, as shown in FIG. 1, includes interior 101, access 103, and shoulder 105. Interior 101 can be used to house, for examples, components associated with a sump. Access 103 can have a similar, larger, or smaller shape as those depicted in cross-sections A—A. If a dimension associated with access 103 (e.g., a diameter if the shape is a circle) is smaller than that of body 160, then shoulder 105 would be the area that surrounds access 103. Preferably, access 103 is located near the top of body 160.

Tank 102 includes manway 104, which is accessible from within interior 101 of containment enclosure 100. Interior 101 is, in turn, accessible via access 103 of containment enclosure 100.

Collar portion 110 is configured to be coupled to tank 102 at joint 112. Joint 112 may be created using any known methods. Joint 112 can be created in the factory or in the field. Preferably, joint 112 is made in the factory. Preferably, collar portion 110 is welded to tank 102 at joint 112. Height h1 associated with collar portion 110 can be a variable. In other words, based on design considerations, including transportation restriction, field conditions, etc. For example, h1 can range from several inches to several feet.

Extension portion 120 is coupled to collar portion 110 at joint 122. Details of joint 122 are disclosed in Applicants' U.S. Provisional Application No. 60/446,512, filed Feb. 12, 2003, which is incorporated herein by reference in its entirety. Joint 122 can be, for example, a double flange joint. Extension portion 120 has a length, h2, which may be field adjustable. In other words, depending on design considerations and field conditions, h2 can be shortened or lengthened, as appropriate. For example, h2 can range from several inches to several feet.

Top portion 130 is coupled to extension portion 120 at joint 132. Joint 132 is preferably similar or identical to joint 122. For example, joint 132 can be a double flange joint. A section of top portion 130 has a length, h3, which may be a variable. In other words, depending on design considerations and field conditions, h3 can be shortened or lengthened, as appropriate. For example, h3 can range from several inches to several feet. If extension portion 120 is not used, top portion 130 is coupled directly to collar portion 110. If multiple portions are not required, then top portion 130 can be modified to be directly coupled to tank 102.

As shown in the drawings, top portion 130 can be configured differently. In some embodiments, e.g., FIG. 2, top portion 130 includes a conical top near the shoulder. In some other embodiments, e.g., FIG. 1, top portion 130 includes a flat top near the shoulder. Other configurations are possible.

Containment enclosure 100 includes leak sensor 150. Leak sensor 150 can be placed in a reservoir, e.g., reservoir 140 shown in FIG. 1. Leak sensor 150 can be placed in any of top portion 130, extension portion 120, or collar portion 110, depending on design. Other factors that can affect the placement of leak sensor 150 includes field conditions, governmental regulations, placements of fixtures within containment enclosure 100, and so on. Preferably, leak sensor 150 is placed in reservoir 140. Reservoir 140 is preferably placed as high as possible to maximize detection zone of body 160. For example, reservoir 140 is placed near, or configured to be part of, shoulder 105, which is located near the upper extremity of body 160.

In a preferred embodiment, leak sensor 150 is preferably mounted on an interior wall or inner wall of top portion 130 for monitoring a level of fluid 142 contained in reservoir 140. Fluid 142 can be, for example, a brine solution.

Figure 2:
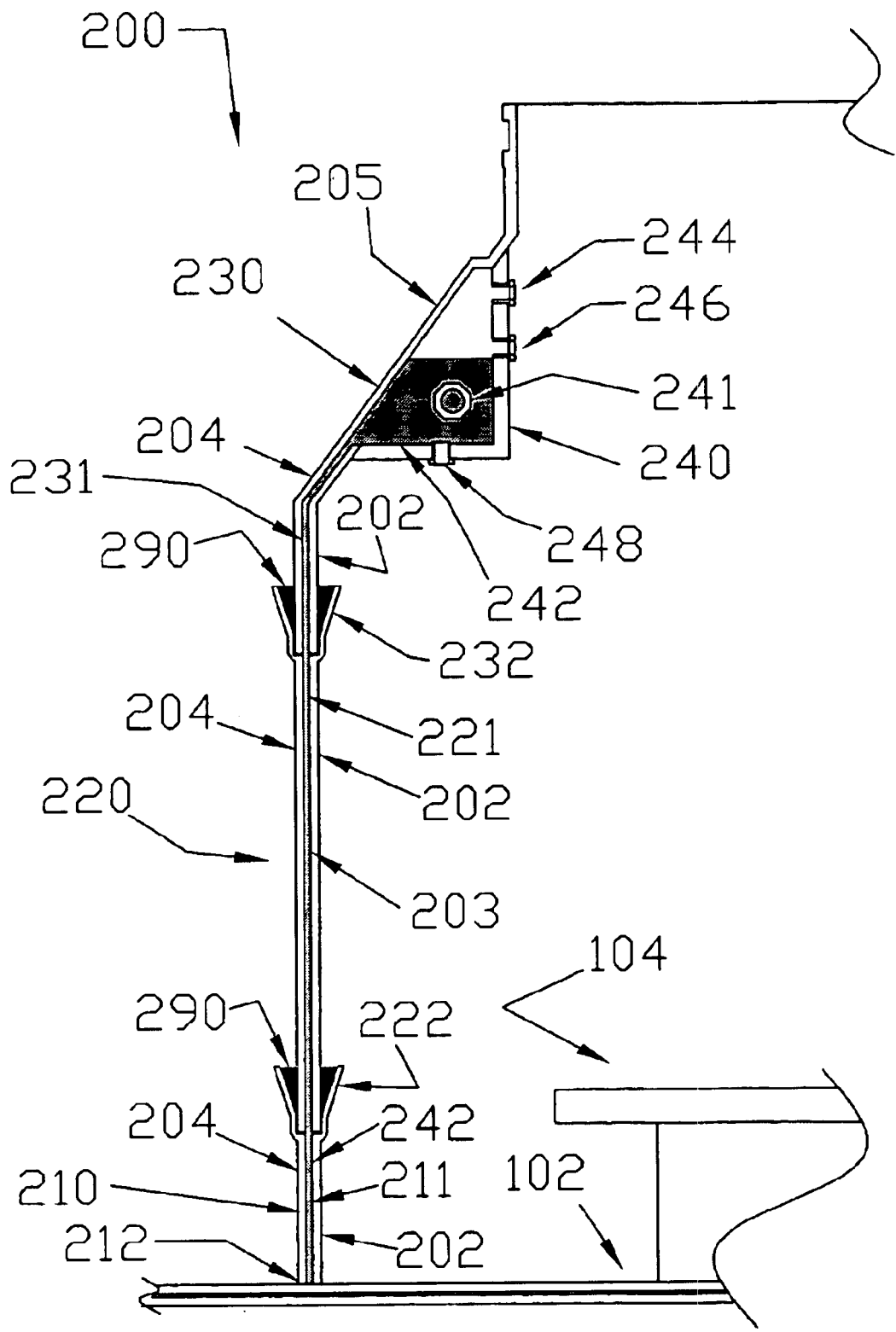
FIG. 2 is a partial view of another exemplary containment enclosure of the invention, showing a preferred embodiment of the invention that includes a reservoir coupled to a shoulder of the containment enclosure that has a conical top.
Figure 3:
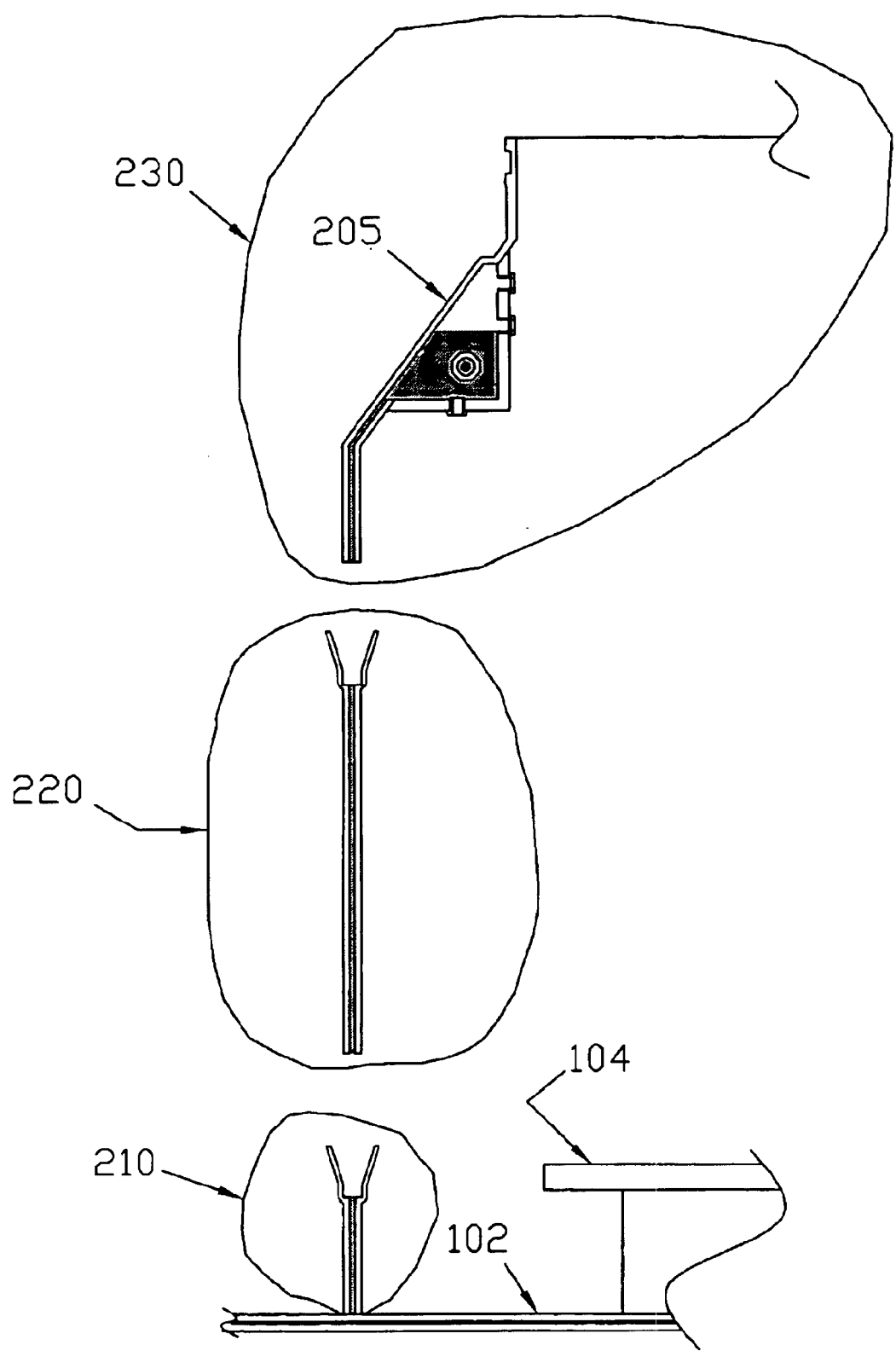
FIG. 3 is an exploded view of the exemplary containment enclosure of the invention shown in FIG. 2 showing a top portion, an extension portion, and a collar portion of the containment enclosure.

FIG. 2 is a partial view of another exemplary containment enclosure of the invention, showing a preferred embodiment of the invention. FIG. 3 is an exploded view of containment enclosure 200, which includes collar portion 210, extension portion 220, and top portion 230. Top portion 230 has a conical shaped top or shoulder 205. In this embodiment, containment enclosure 200 includes reservoir 240. Reservoir 240 is fabricated into (or being integrated as part of) the conical top or shoulder 205 of containment enclosure 200.

Collar portion 210 is coupled to tank 102 at joint 212. Extension portion 220 is coupled to collar portion 210 at joint 222. Top portion 230 is coupled to extension portion 220 at joint 232. Joints 222 and 232 are preferably double flanged joints. Adhesive or caulk 290 is used to couple different portions of containment enclosure 200 at joints 222 and 232. Preferably, joints 222 and 232 are configured such that fluid 242 (or brine) can flow freely through them, between inner 202 and outer wall 204, along each of collar portion 210, extension portion 220, and top portion 230.

Top portion 230 includes top monitoring space 231. Extension portion 220 includes extension monitoring space 221. Collar portion 210 include collar monitoring space 211. Each of monitoring spaces 231, 221, and 211 are defined by inner wall 202 and outer wall 204, as indicated in FIG. 2. In this embodiment, since monitoring spaces 231, 221, and 211 are in fluid communication, they are collectively known as the integrated monitoring space 203. As shown in FIG. 2, integrated monitoring space 203 is filled with fluid 242.

Reservoir 240 is in fluid communication with integrated monitoring space 203 between walls 202 and 204. If a leak were to occur in containment enclosure 200, fluid 242 would gradually leak out causing the level to drop in reservoir 240. If the level were to drop too low, a sensor placed at location 241 would indicate that containment enclosure 200 is leaking. Any known sensor may be placed at location 241. For example, a float sensor may be used.

Preferably, reservoir 240 includes one or more openings 244, 246, and 248. Preferably, one or more of these openings are closable and leak resistant. Each opening may serve a different purposes. For example, in the exemplary embodiment shown in FIG. 2, opening 244 can be used to fill reservoir 240 with fluid 242. Opening 248 may be used to drain fluid 242 out of reservoir 240. Opening 246 may be used as a vent to facilitate movement of fluid 242 in reservoir 240 and within integrated monitoring space 203 and to limit the fluid level in reservoir 240 when filling reservoir 240 space with fluid 242.

Figure 4:
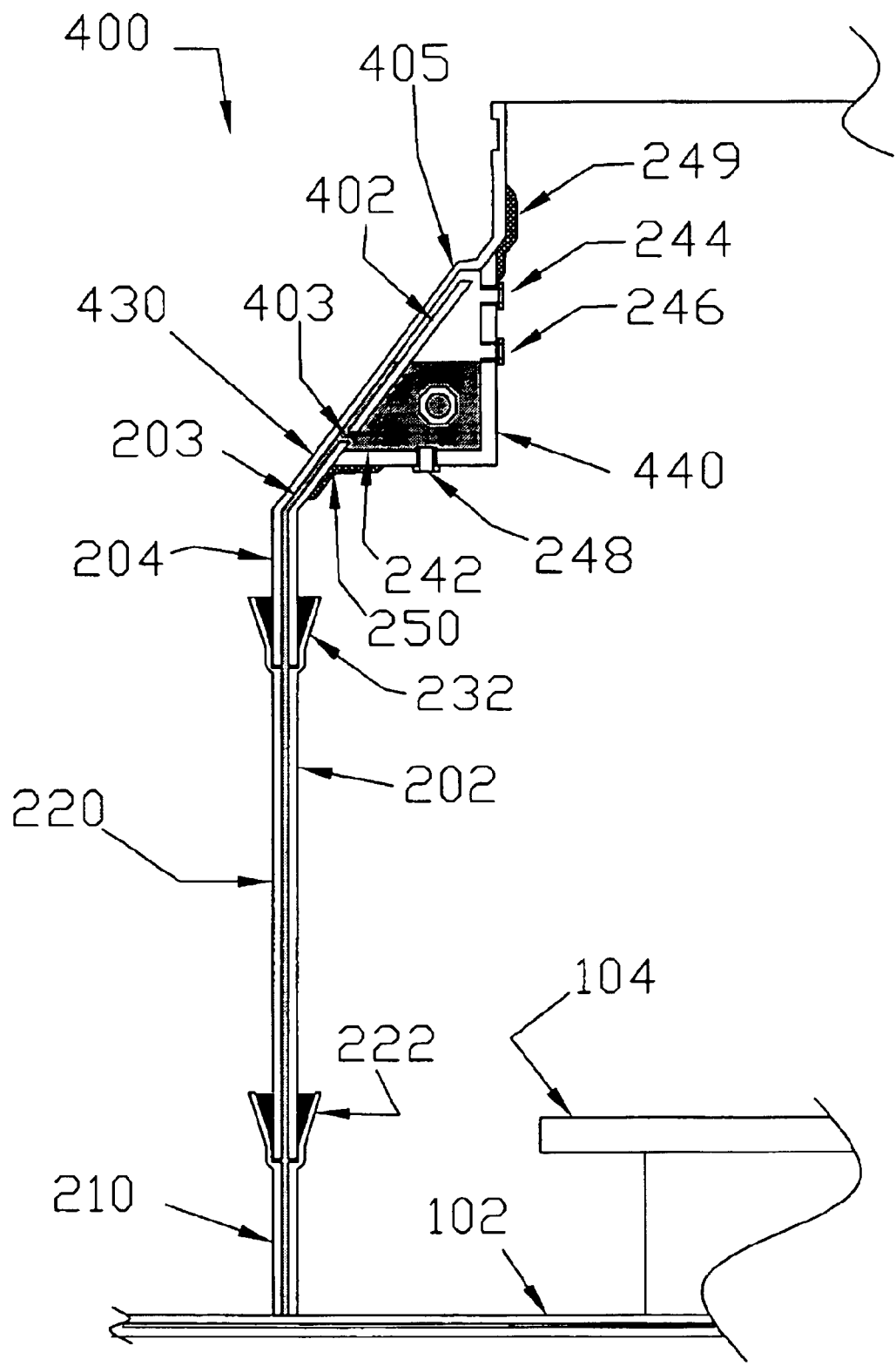
FIG. 4 is a partial view of another exemplary containment enclosure of the invention, showing another embodiment of the invention that includes a reservoir coupled to a shoulder of the containment enclosure.
Figure 5:
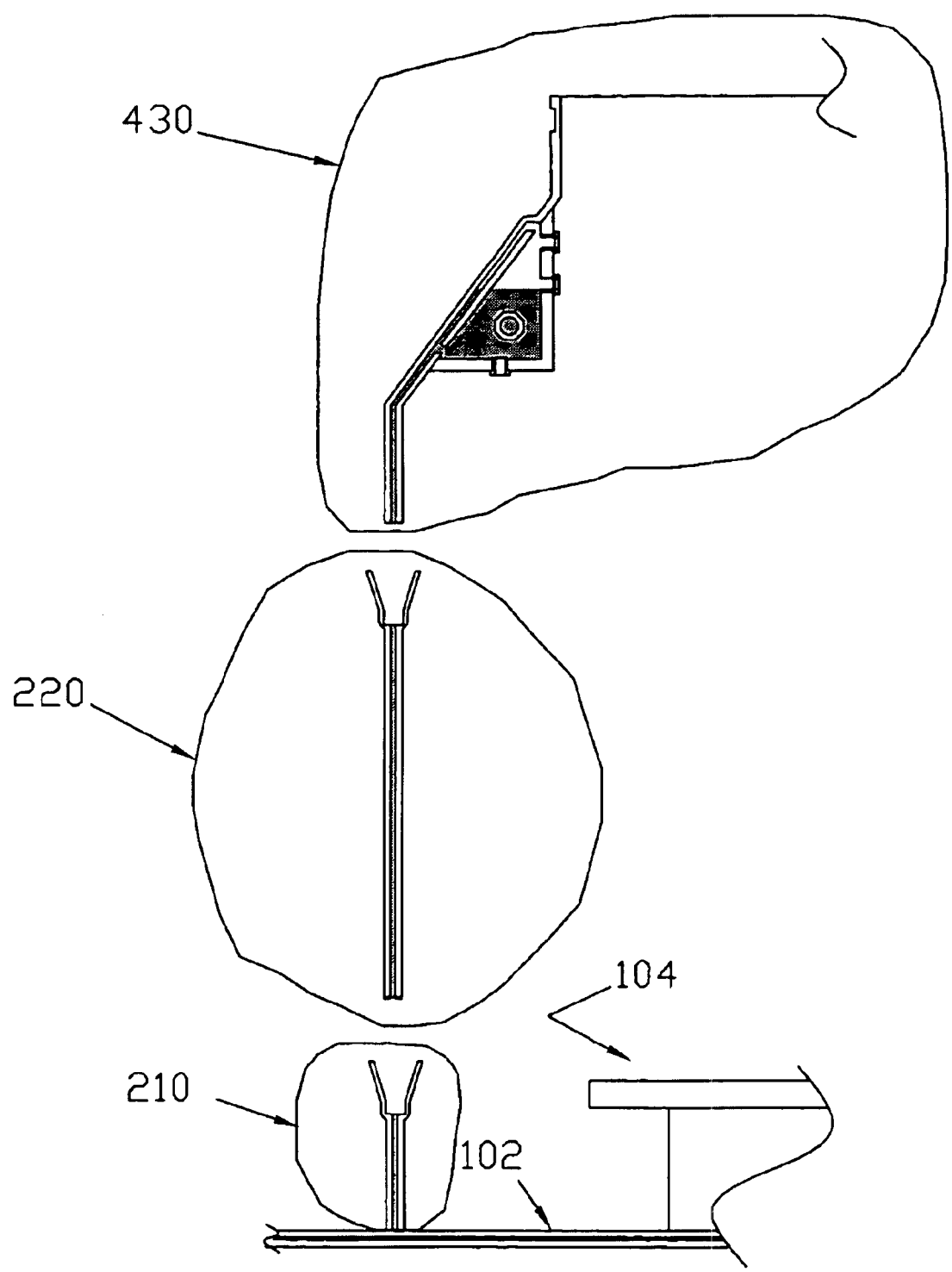
FIG. 5 is an exploded view of the exemplary containment enclosure of the invention shown in FIG. 4 showing a top portion, an extension portion, and a collar portion of the containment enclosure.

FIG. 4 is a partial view of another exemplary containment enclosure of the invention, showing a preferred embodiment of the invention. FIG. 5 is an exploded view of containment enclosure 400, which includes collar portion 210, extension portion 220, and top portion 430. Top portion 430 has a conical shaped top or shoulder 405. In this embodiment, containment enclosure 400 includes reservoir 440. Unlike reservoir 240 which is part of containment enclosure 200, reservoir 440 is a component or unit that is separate from top portion 430. In other words, reservoir 440 is separately attachable to the conical top or shoulder 405 of containment enclosure 400.

Reservoir 440 is attached to the inner wall 402. Reservoir 440 can be attached to containment enclosure 400 using any known methods. Preferably, reservoir 440 can be attached to inner wall 402 using supports 249 and 250. Supports 249 and 250 can include one or more of fasteners (e.g., screws, bolts, etc.), brackets, hooks, or by other means including by welding, glues, etc.

One or more holes 403 on inner wall 402 provide annular space continuity or fluid communication between reservoir 440 and integrated monitoring space 203. Inner wall 402 is preferably an integral or extension part of inner wall 202. Hole 403 provides a way for fluid 242 to flow between reservoir 440 and integrated monitoring space 203. Thus, as shown in FIGS. 2–5, a reservoir of the invention can be integrated (e.g., reservoir 240) or attachable (e.g., reservoir 440) to different containment enclosures of the invention.

Figure 6:
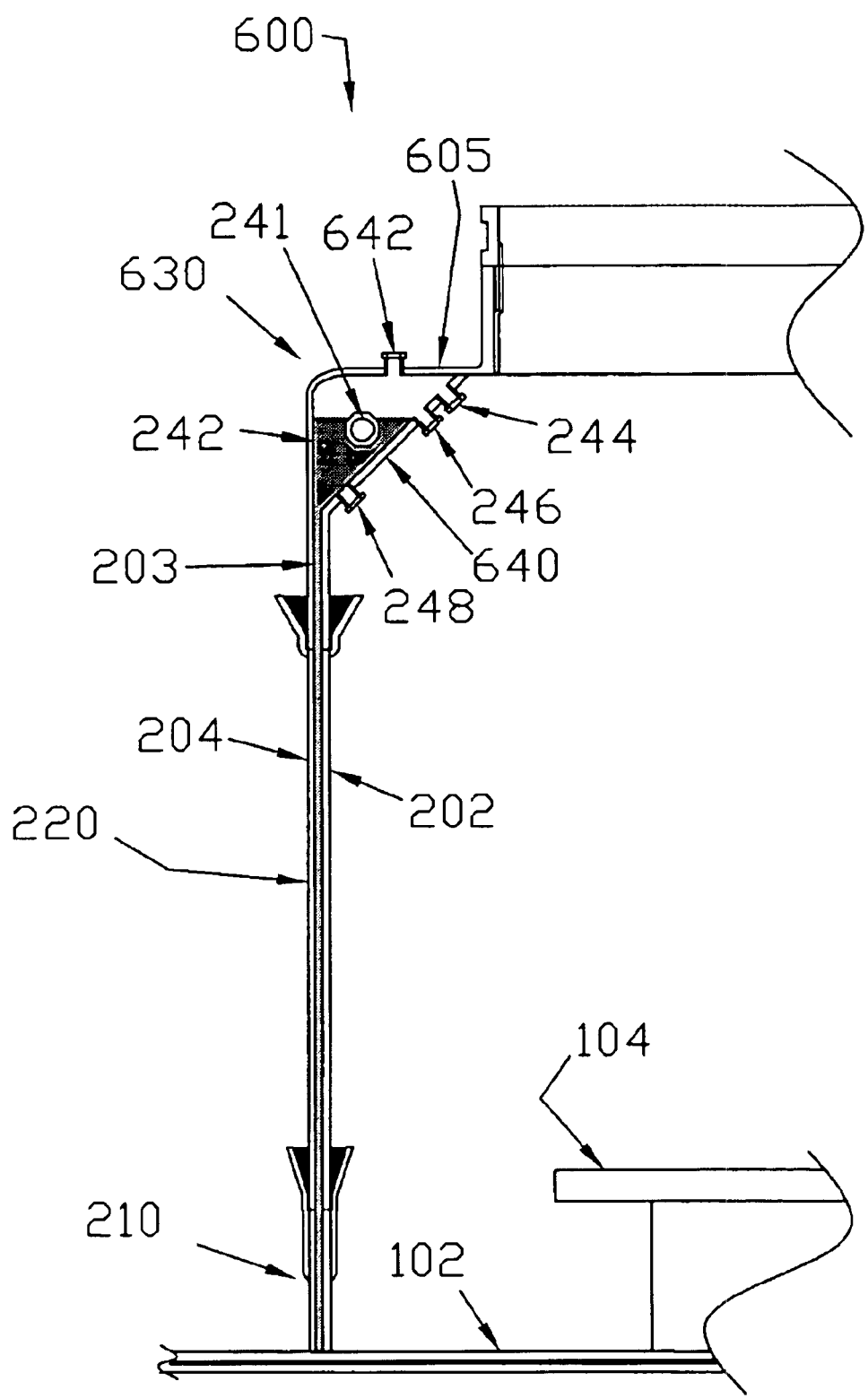
FIG. 6 is a partial view of another exemplary containment enclosure of the invention, showing another embodiment of the invention that includes a reservoir coupled to a shoulder of the containment enclosure that has a flat top.
Figure 7:
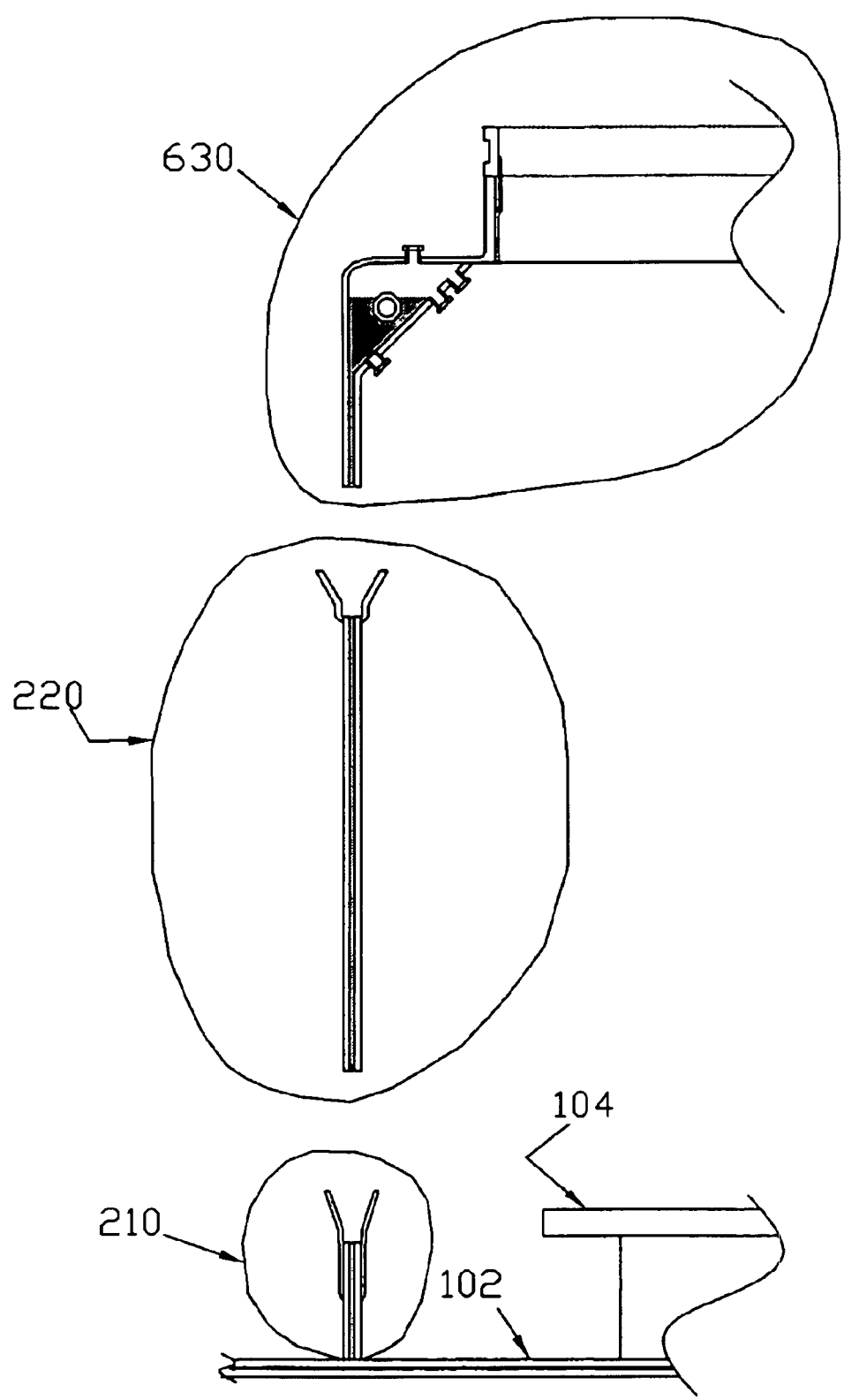
FIG. 7 is an exploded view of the exemplary containment enclosure of the invention shown in FIG. 6 showing a top portion, an extension portion, and a collar portion of the containment enclosure.

FIG. 6 is a partial view of another exemplary containment enclosure of the invention, showing another embodiment of the invention that includes a reservoir coupled to a flat top. FIG. 7 is an exploded view of the exemplary containment enclosure of the invention shown in FIG. 6. Containment enclosure 600 includes collar portion 210, extension portion 220, and top portion 630. Reservoir 640 is coupled to top portion 630 that has a flat shape top or shoulder 605. Reservoir 640 functions similarly to reservoir 240. It addition, reservoir 640 is coupled to containment enclosure 600 similarly as reservoir 240 is coupled to containment enclosure 200.

In this embodiment, top portion 630 is similar to top portion 230 described above, except that top portion 630 includes a flat top, rather than a conical top, and reservoir 640 includes an additional opening 642. Additional opening 642 can be used to fill reservoir 640 with fluid 242. In this configuration, since additional opening 642 is located on outer wall 204, it would be easier to fill reservoir 640 via opening 642 than to do so using opening 244 that is on inner wall 202. Additionally, opening 642 may also be used to place a sensor in reservoir 640. In this manner, if the fluid level were to drop too low, the sensor placed through opening 642 would indicate that containment enclosure 600 is leaking. Any known sensor may be placed at location 642. For example, a float sensor may be used.

Figure 8:
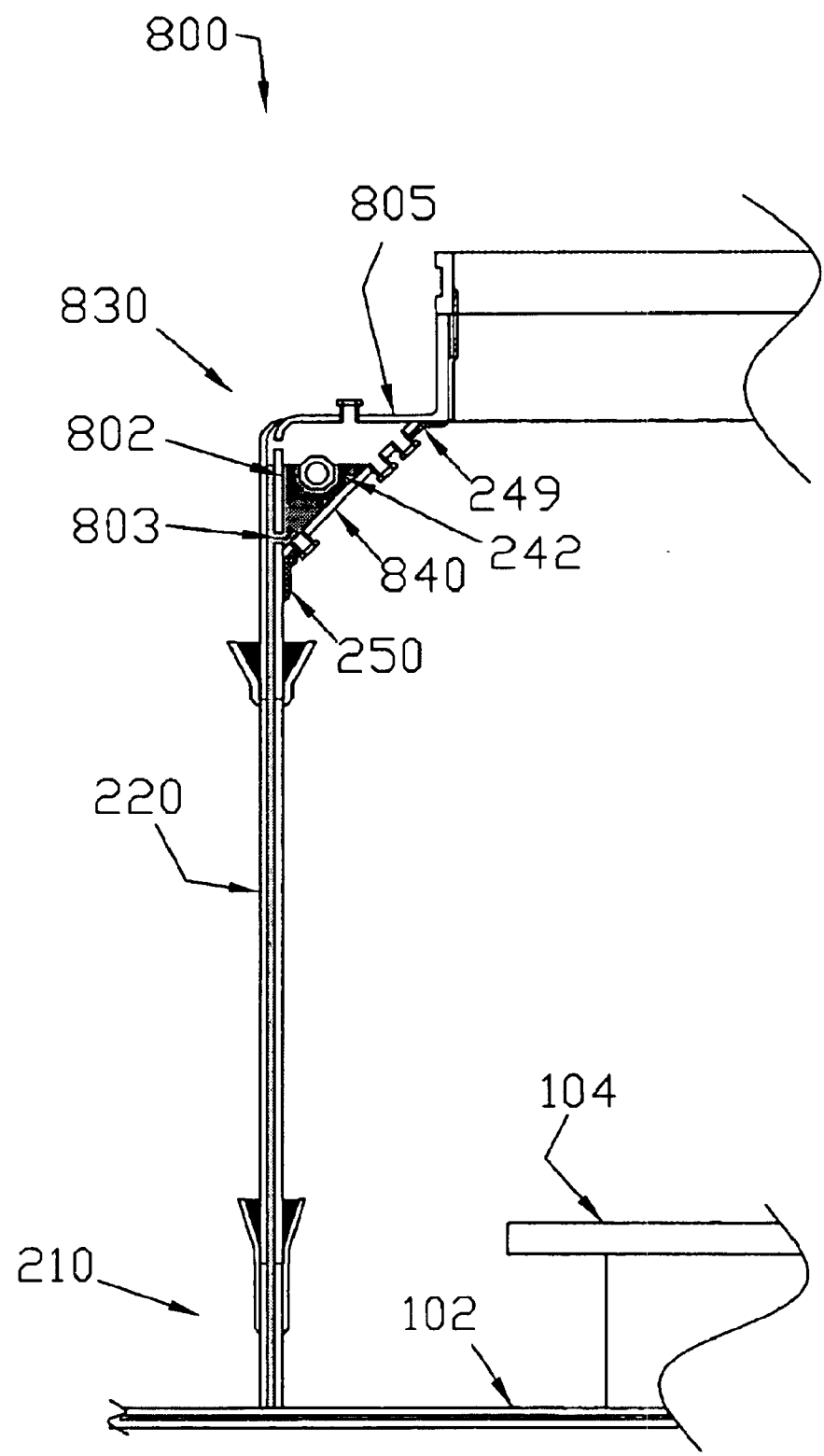
FIG. 8 is a partial view of another exemplary containment enclosure of the invention, showing another embodiment of the invention that includes a reservoir coupled to a shoulder of the containment enclosure that has a flat top.
Figure 9:
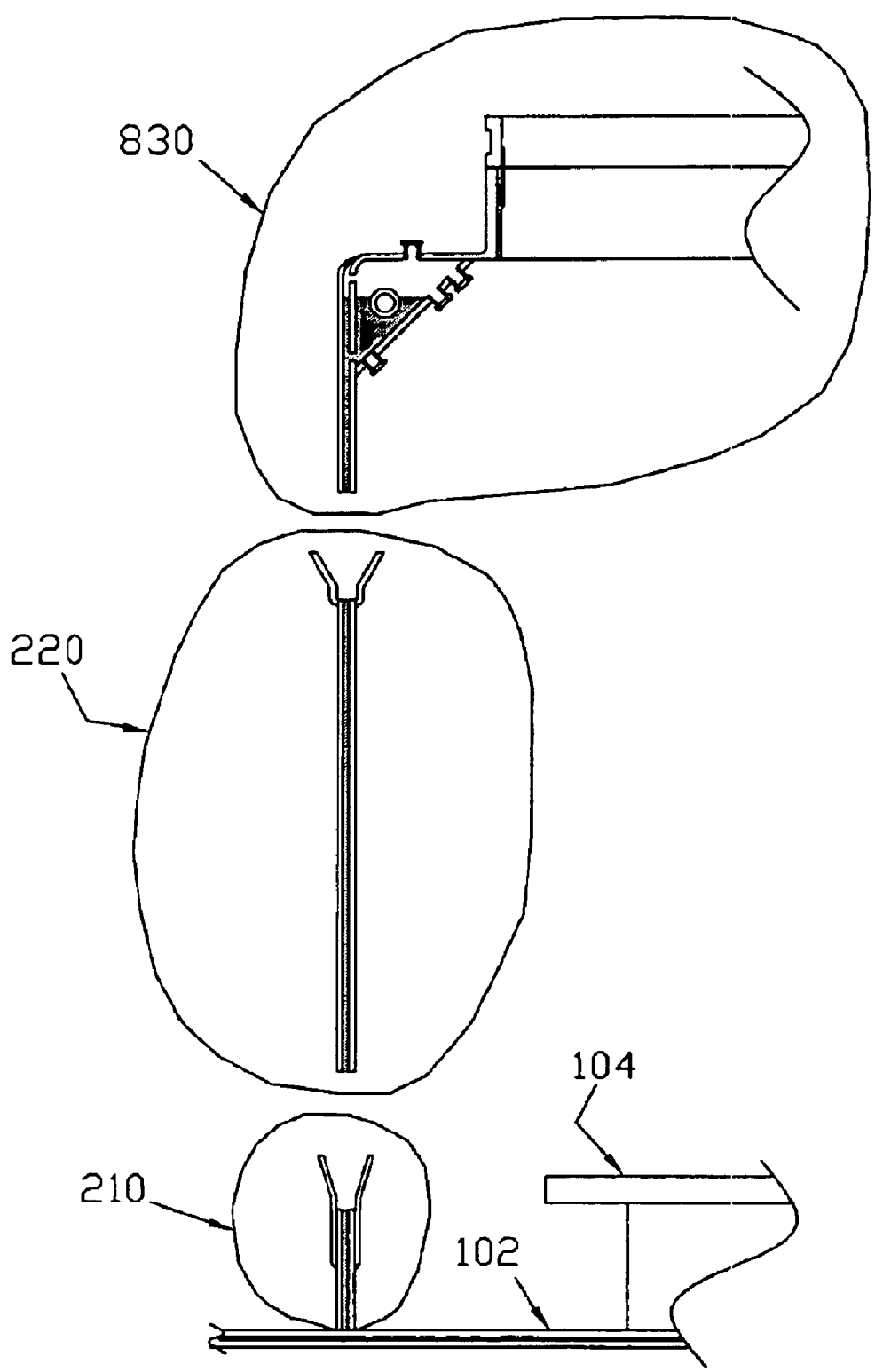
FIG. 9 is an exploded view of the exemplary containment enclosure of the invention shown in FIG. 8 showing a top portion, an extension portion, and a collar portion of the containment enclosure.

FIG. 8 is a partial view of another exemplary containment enclosure of the invention, showing another embodiment of the invention that includes a reservoir coupled to a flat top of shoulder 805. FIG. 9 is an exploded view of the exemplary containment enclosure of the invention shown in FIG. 8. Containment enclosure 800 includes collar portion 210, extension portion 220, and top portion 830. Top portion 830 has a flat shape top or shoulder 805, and it is coupled to reservoir 840.

In this embodiment, top portion 830 is similar to top portion 430 described above. Reservoir 840 is attached to the inner wall 802. Inner wall 802 is preferably an integral part of inner wall 202. Hole 803 provides a way for fluid 242 located with reservoir 840 to flow freely between reservoir 840 and integrated monitoring space 203. Reservoir 840 is attached to containment enclosure by supports 249 and 250.

It is noted that any one of reservoir 240, 440, 640, and 840 can be confined to a limited portion or the full extent of the shoulder of the containment enclosure. In other words, in one exemplary implementation, the reservoir can extent the entire circumference around the top portion. In another exemplary implementation, the reservoir may extent a smaller portion of the circumference of the top portion. Similarly, the reservoir may extend fully from the inner wall along the full length of the shoulder (see reservoir 1017 in FIG. 11) or any portion thereof (e.g., reservoirs 1015, 1016, 1021, 1023, etc.).

Additionally, more than one reservoir may be configured to detect different portions of the containment enclosure or multiple reservoirs may be connected and used as one. For example, each of the top portion, the extension portion, and the collar portion may be associated with a reservoir. Furthermore, different reservoirs may be used to detect leaks in, for example, eastern, northern, southern, and western portions of the containment enclosure.

Figure 10:
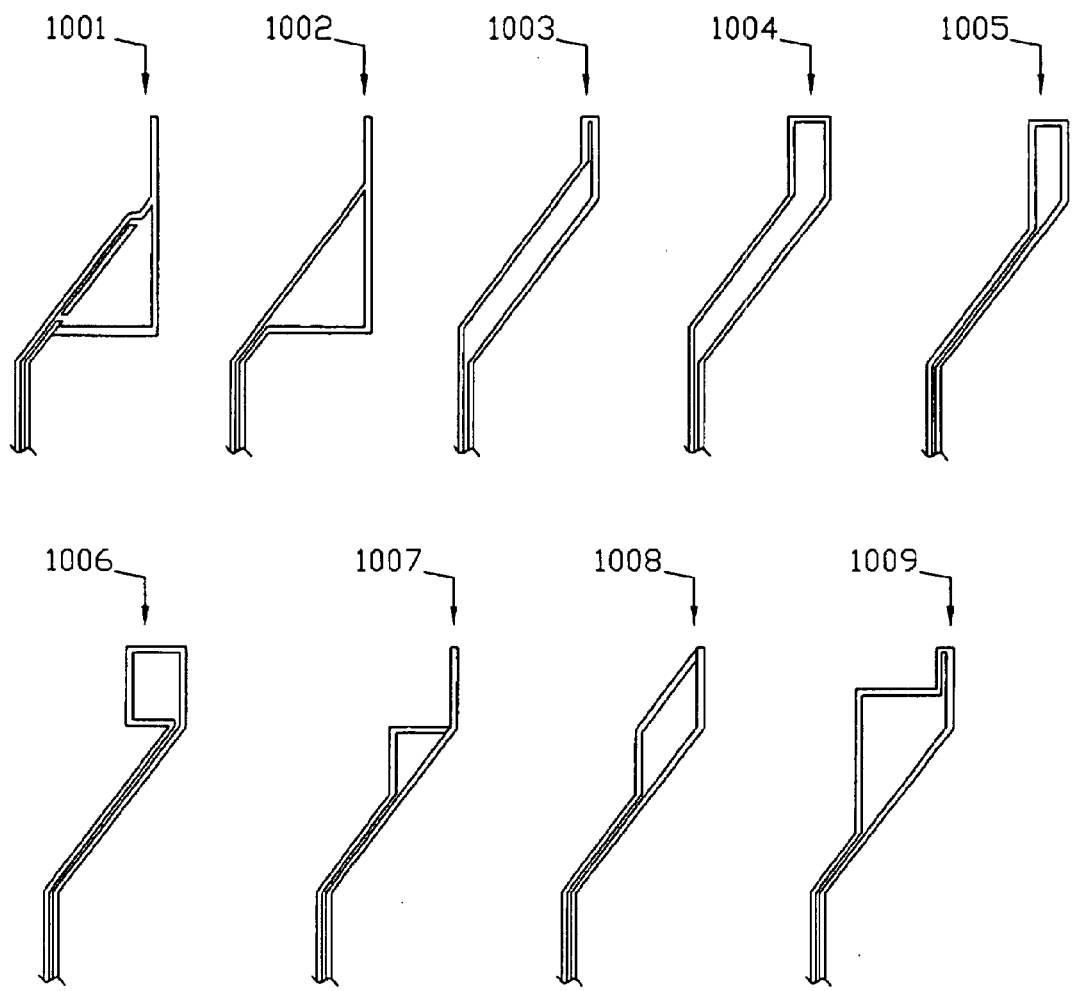
FIG. 10 shows different configurations of the reservoir of the invention.
Figure 11:
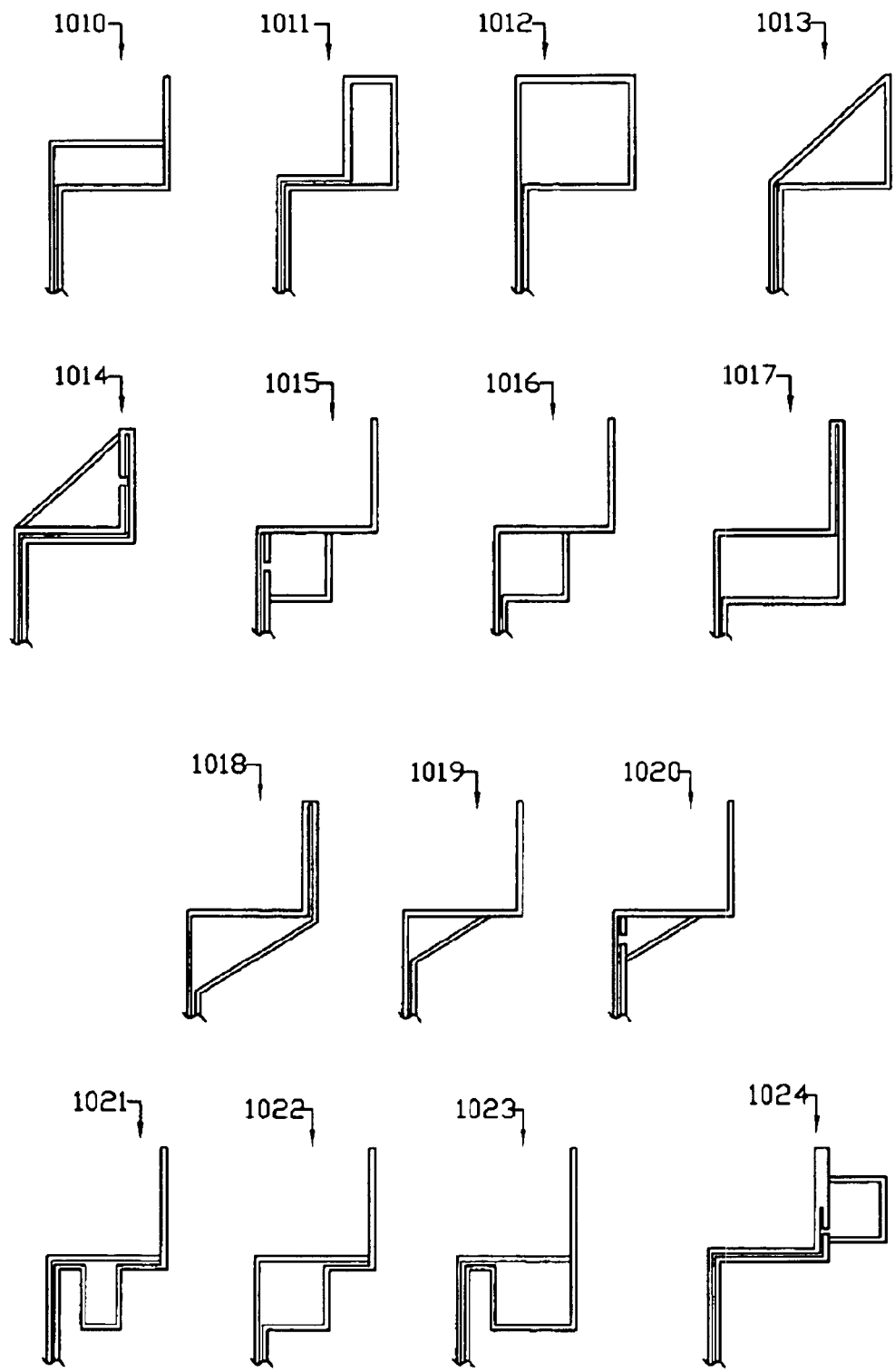
FIG. 11 shows additional configurations of the reservoir of the invention.

FIGS. 10 and 11 show 24 different configurations of the reservoir that can be coupled to an exemplary containment enclosure of the invention. These configurations are disclosed to indicate some of the many configurations contemplated by the inventors, and they are shown for illustrative purposes. Additional configurations are possible. The invention is not limited to the configurations specifically disclosed herein.

Reservoir 1001 is configured to be coupled to a containment enclosure on the interior side of the containment enclosure. As shown, reservoir 1001 has fluid communication with a monitoring space via a hole on an inner wall of the containment enclosure. Reservoir 1001 has a vertical wall and a horizontal wall.

Reservoir 1002 is configured to be coupled to a containment enclosure on the interior side of the containment enclosure. As shown, an inner wall of the containment enclosure forms part of reservoir 1002, and reservoir 1002 has fluid communication with a monitoring space of the containment enclosure. Reservoir 1002 has a vertical wall and a horizontal wall.

Reservoir 1003 is configured to be coupled to a containment enclosure. As shown, an inner wall and an outer wall of the containment enclosure forms reservoir 1003. Indeed, reservoir 1003 is an enlarged portion of a monitoring space of the containment enclosure. The enlargement facilitates placement of a sensor and detection fluid. Reservoir 1003 has an interior slope wall, which is an extension of the inner wall and an exterior slope wall, which is an extension of the outer wall.

Reservoir 1004 is similar to reservoir 1003. As shown, reservoir 1004 differsfrom reservoir 1003 in that reservoir 1004 has an enlarge portion near the access to the interior of the containment enclosure.

Reservoir 1005 is similar to reservoir 1004. As shown, reservoir 1005 differs from reservoir 1004 in that reservoir 1005 does not have an enlarge portion along the sloped portion. It can be described that reservoir 1005 is placed along a portion or the entire circumference of the access to the interior of the containment enclosure.

Reservoir 1006 is similar to reservoir 1004. Reservoir 1006 is configured to be coupled to an exterior of the containment enclosure. As shown, reservoir 1006 can be an external reservoir that is coupled to the top portion of the containment enclosure near the access to the interior of the containment enclosure. Reservoirs 1007, 1008, and 1009 are three additional possible variations of a reservoir that can be coupled to a containment enclosure having a conical top or sloped shoulder.

Reservoirs 1010 through 1023 are exemplary reservoirs that can be coupled to a containment enclosure having a flat top or horizontal shoulder.

Reservoir 1010 extends along the full horizontal portion of a shoulder of the containment enclosure. As shown, the upper and exterior walls of reservoir 1010 are an extension of the outer wall of the containment enclosure, and the lower and interior walls are an extension of the inner wall of the containment enclosure. Reservoir 1010 has fluid communication with a monitoring space of the containment enclosure, which is defined by the outer and inner walls.

Reservoir 1011 extends along a fraction of the horizontal portion of the shoulder and the full extent of the vertical portion of the shoulder.

Reservoir 1012 is a combination of reservoirs 1010 and 1011. In other words, reservoir 1012 extends fully along the vertical and horizontal portions of the shoulder.

Reservoir 1013 is another variation that includes a slope wall, which is an extension of the outer wall of the containment enclosure.

Reservoir 1014 differs from reservoir 1013 in at least one significant aspect. That is, the sloped wall of reservoir 1014 is not an extension of the outer wall of the containment enclosure. Rather, the sloped wall is an additional wall that serves as an exterior wall of reservoir 1014 while an extension of the outer wall serves as an interior wall of reservoir 1014. Reservoir 1014 has fluid communication with the monitoring space of the containment enclosure via one or more holes.

Reservoirs 1010 through 1014 are configured to be coupled to an exterior of the containment enclosure. Reservoir 1015 through 1023 are configured to be coupled to an interior of the containment enclosure. As indicated, the reservoir can extend partially or fully between the inner wall of the containment enclosure to the edge of the access to the interior of the containment enclosure.

Reservoir 1015 includes a horizontal wall that is coupled to the inner of the containment enclosure. Reservoir 1015 also includes a vertical wall that joins the horizontal wall to the shoulder, which is an extension of the outer wall. Reservoir 1015 has fluid communication with the monitoring space through one or more holes on the inner.

Reservoir 1016 differs from reservoir 1015 in that the horizontal and vertical walls of reservoir 1016 are an extension of the inner wall of the containment enclosure. It can be described that reservoir 1016 is an enlarged portion of the monitoring space that is located near the shoulder.

Reservoir 1017 is similar to reservoir 1016. However, reservoir 1017 extends fully from the outer wall to the edge of the access to the interior of the containment enclosure.

Reservoirs 1021, 1022, and 1023 are additional variations of reservoir 1017. Reservoir 1021 is an illustration that the reservoir can be placed in a middle portion of the shoulder. Reservoir 1022 indicates that the reservoir can be placed near the monitoring space. Reservoir 1023 indicates the reservoir can be placed away from the monitoring space and be closer to the access to the interior of the containment enclosure.

Reservoir 1024 demonstrates that the reservoir can also be placed above the shoulder.

Reservoirs 1018, 1019, and 1020 are three configurations indicating arrangements similar to those of reservoirs 1021, 1022, and 1023 can be implemented for reservoirs with a sloped wall.

Figure 12:
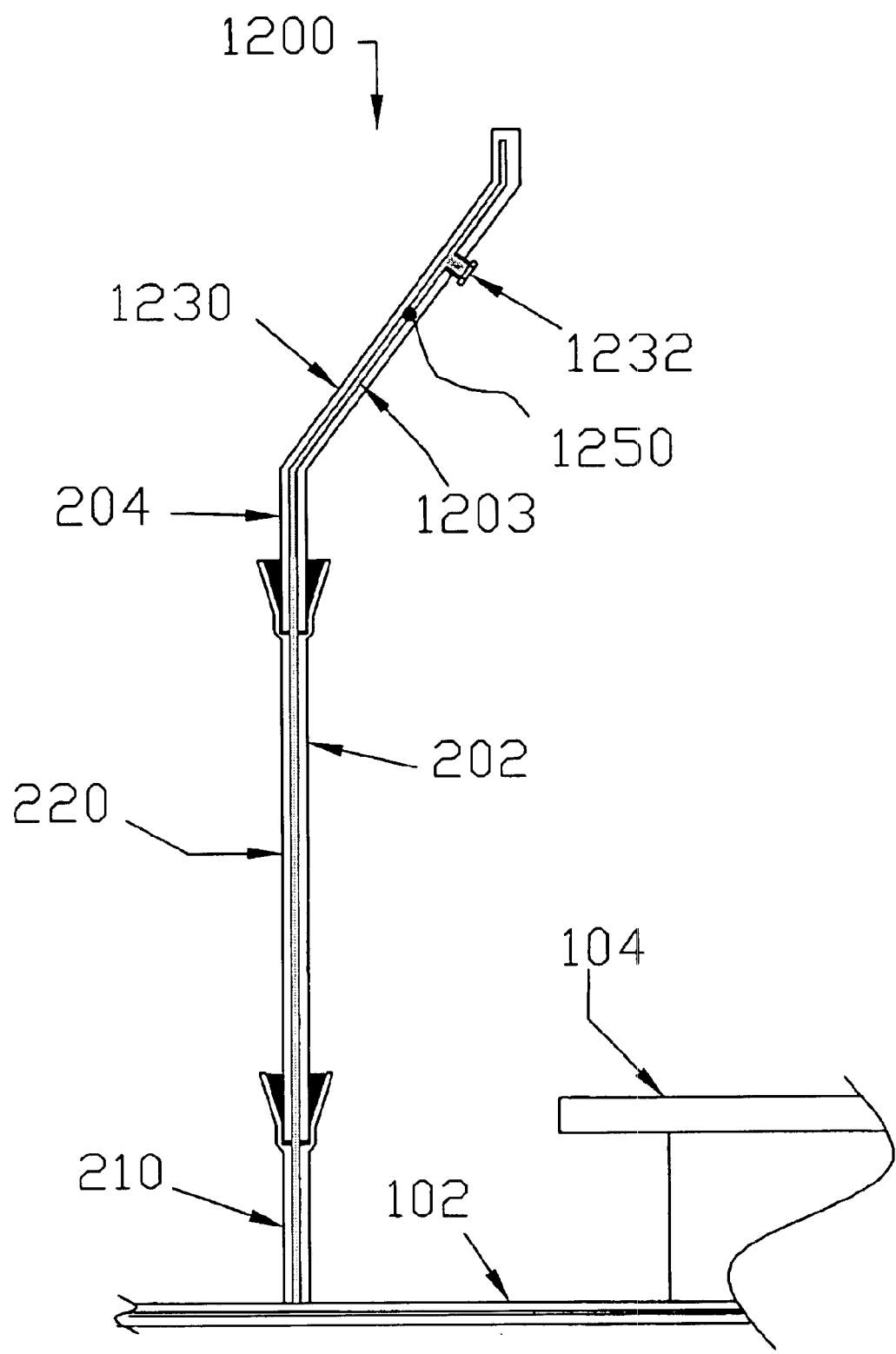
FIG. 12 is a partial view of another exemplary containment enclosure of the invention, showing another embodiment of the invention that does not include a reservoir coupled to a monitoring space of the containment enclosure's conical top.

FIG. 12 is a partial view of another exemplary containment enclosure of the invention, showing another embodiment of the invention that does not include a reservoir. Containment enclosure 1200 includes top portion 1230. In this embodiment, sensor 1250 can be placed anywhere in integrated monitoring space 1203, which includes a first monitoring space associated with top portion 1230, a second monitoring space associated with extension portion 220, and a third monitoring space associated with collar portion 210. Sensor 1250 can be placed via, for example, opening 1232 of top portion 1230. Any known sensor may be used. Integrated monitoring space 1203 can be a vacuum or pressurized or fluid filled.

Figure 13:
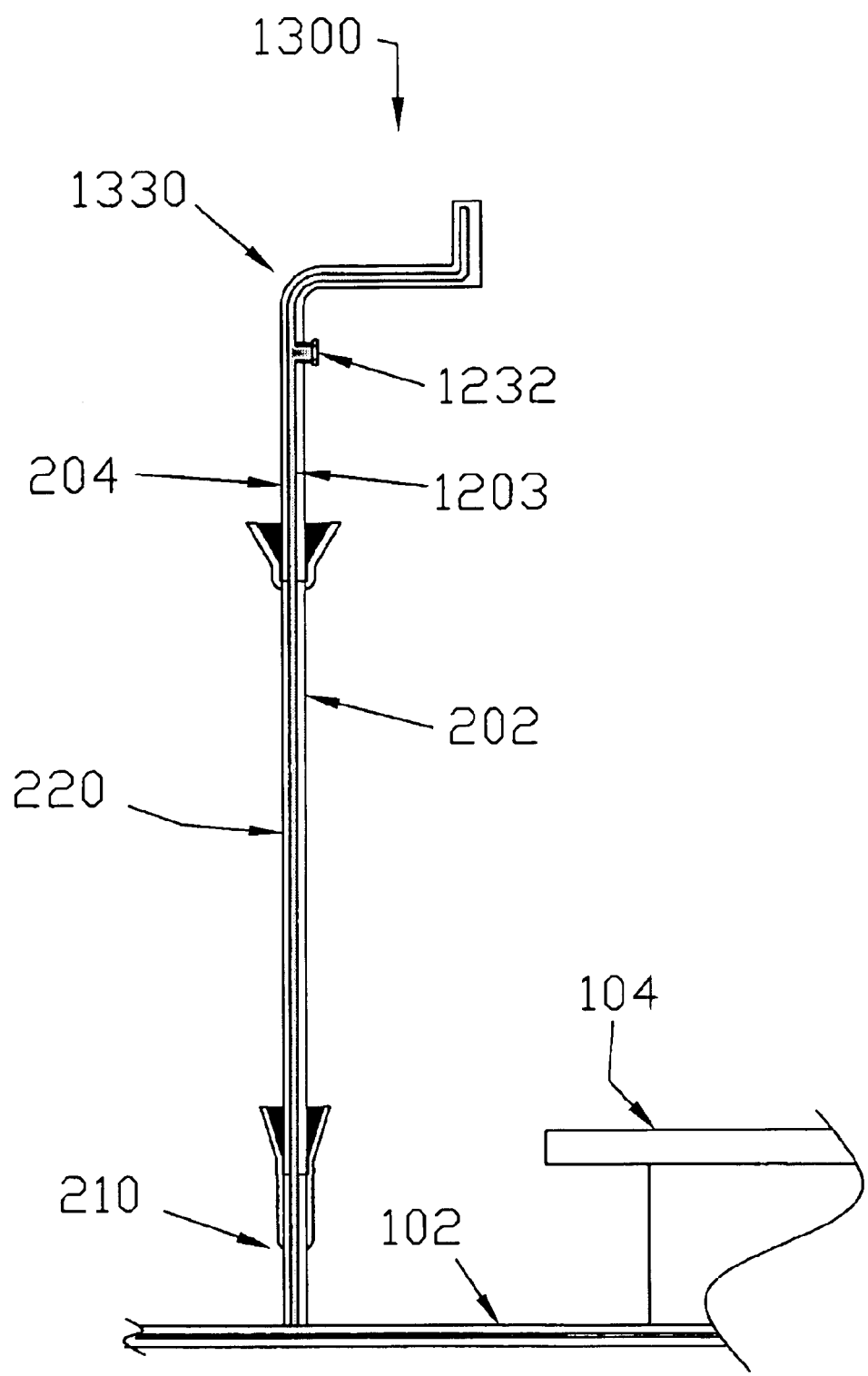
FIG. 13 is a partial view of another exemplary containment enclosure of the invention, showing another embodiment of the invention that does not include a separate reservoir coupled to a monitoring space of the containment enclosure's flat top.

FIG. 13 is a partial view of another exemplary containment enclosure of the invention, showing another embodiment of the invention that does not include a reservoir. The embodiment shown in FIG. 13 is similar to that which is depicted in FIG. 12. Containment enclosure 1300 includes top portion 1330. In this embodiment, top portion 1330 is different from top portion 1230 in its flat top shape. Top portion 1230 depicted in FIG. 12 has a conical top shape.

Figure 14:
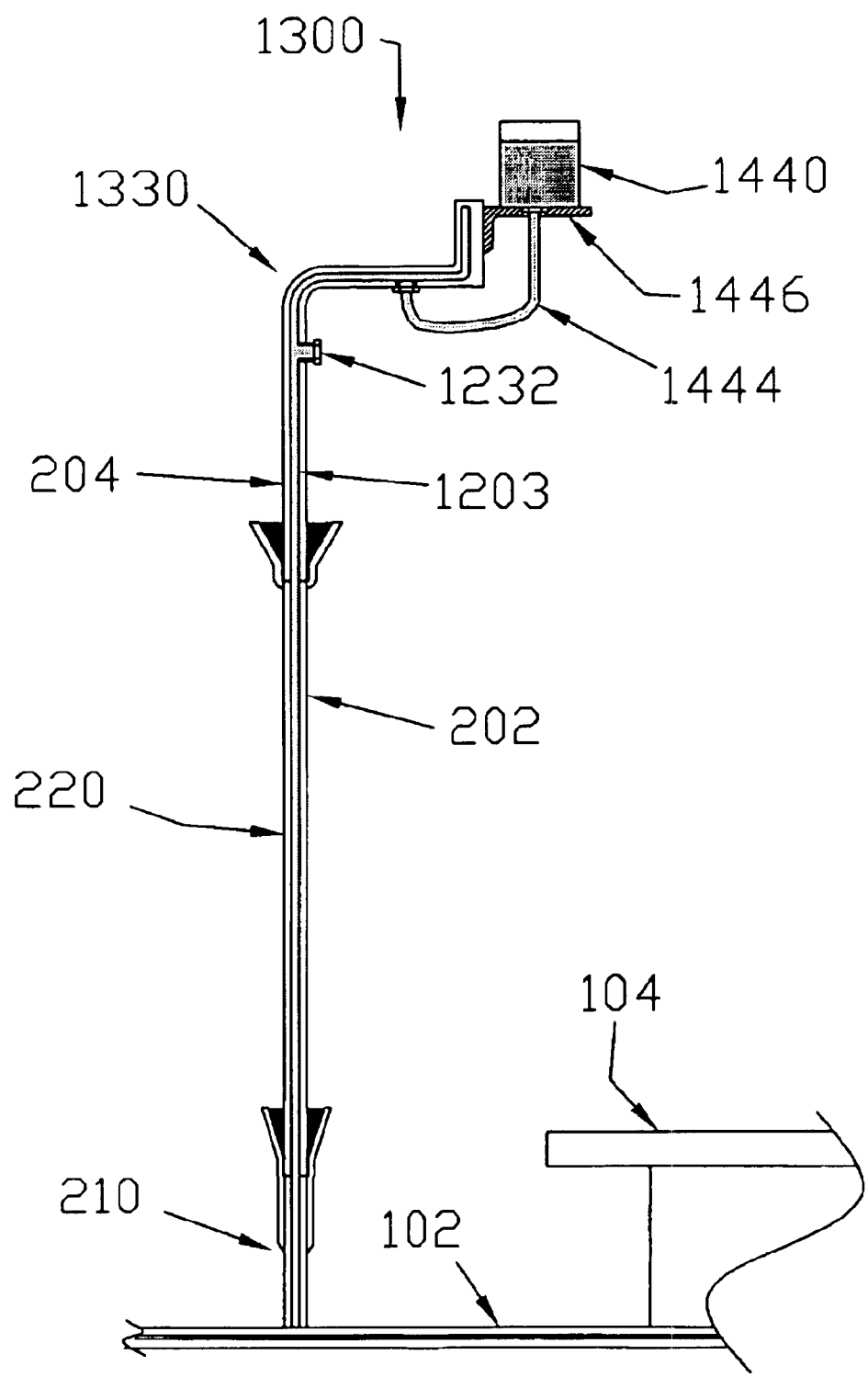
FIG. 14 is a partial view of another exemplary containment enclosure of the invention, showing another embodiment of the invention that includes a reservoir coupled to a monitoring space of the containment enclosure's flat top using a hose.

FIG. 14 is a partial view of another exemplary containment enclosure of the invention, showing another embodiment of the invention that includes a reservoir coupled to a monitoring space of the containment enclosure's flat top using a hose. Unlike any of the reservoirs previously described, none of the walls of reservoir 1440 is an integrated part or otherwise attached to a wall of containment enclosure 1300. Rather, reservoir 1440 is an independent component. Reservoir 1440 has fluid communication with integrated monitoring space 1203 via hose 1444. Hose 1444 can be attached to integrated monitoring space 1203 using any known methods, including the use of quick release connectors or other coupling devices. Reservoir 1440 is preferably placed at a location as high as possible to maximize detection zone of containment enclosure 1300. For example, bracket 1446 may be attached to containment enclosure 1300 to support reservoir 1440. Alternatively, reservoir 1440 may be hung using a hook or a like device. Further, if a lid or cover is used to cover the access to the interior of containment enclosure 1300, reservoir 1440 may be hung under the lid.

Figure 15:
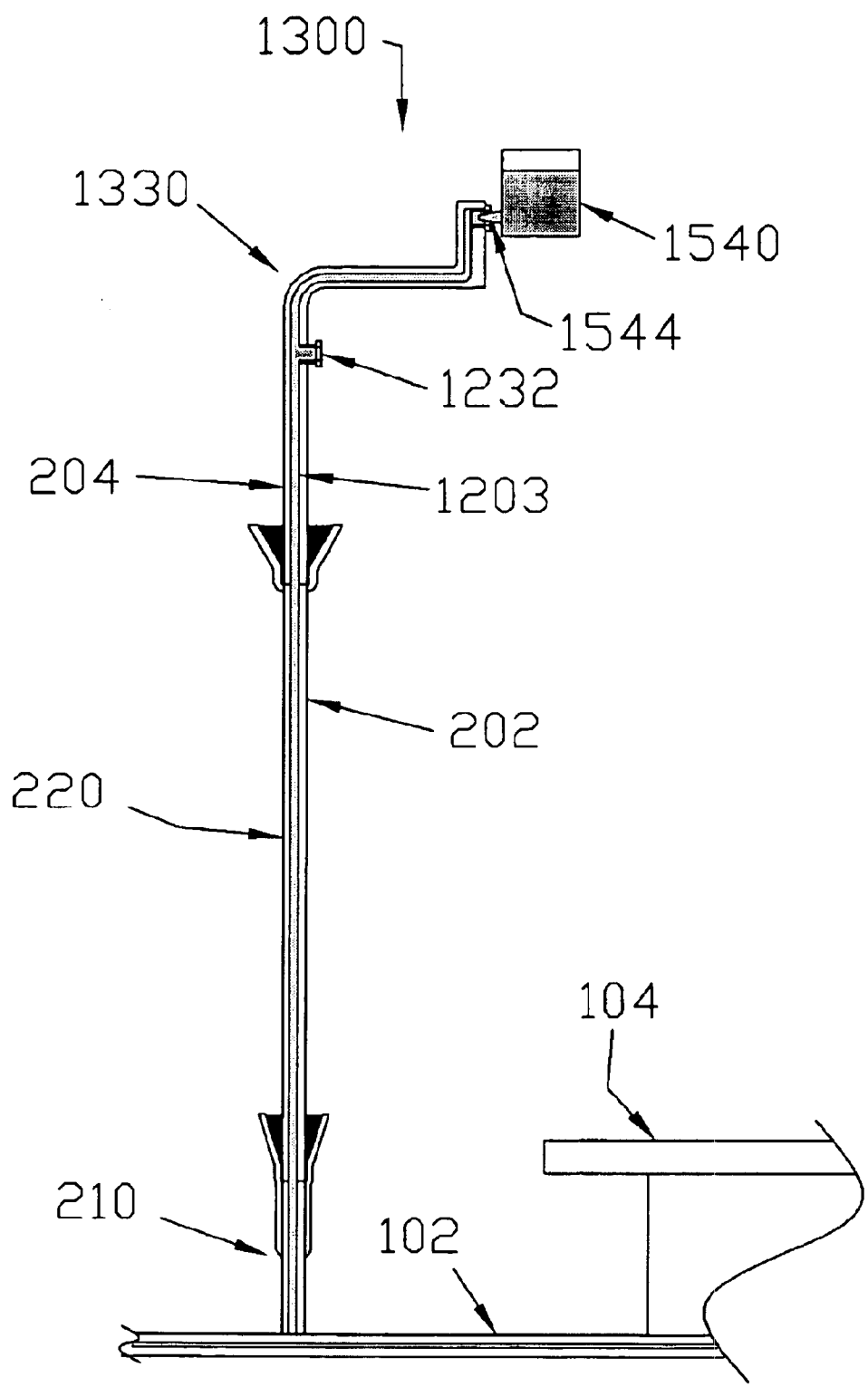
FIG. 15 is a partial view of another exemplary containment enclosure of the invention, showing another embodiment of the invention that includes a reservoir coupled to a monitoring space of the containment enclosure's flat top using a connector.

FIG. 15 is a partial view of another exemplary containment enclosure of the invention, showing another embodiment of the invention that includes reservoir 1540 coupled to a monitoring space of the containment enclosure's flat top using connector 1544. Connector 1544 is preferably a quick release connector. In this embodiment, fluid communication between reservoir 1540 and integrated monitoring space 1203 is facilitated by connector 1544. No hose is required.

Figure 16:
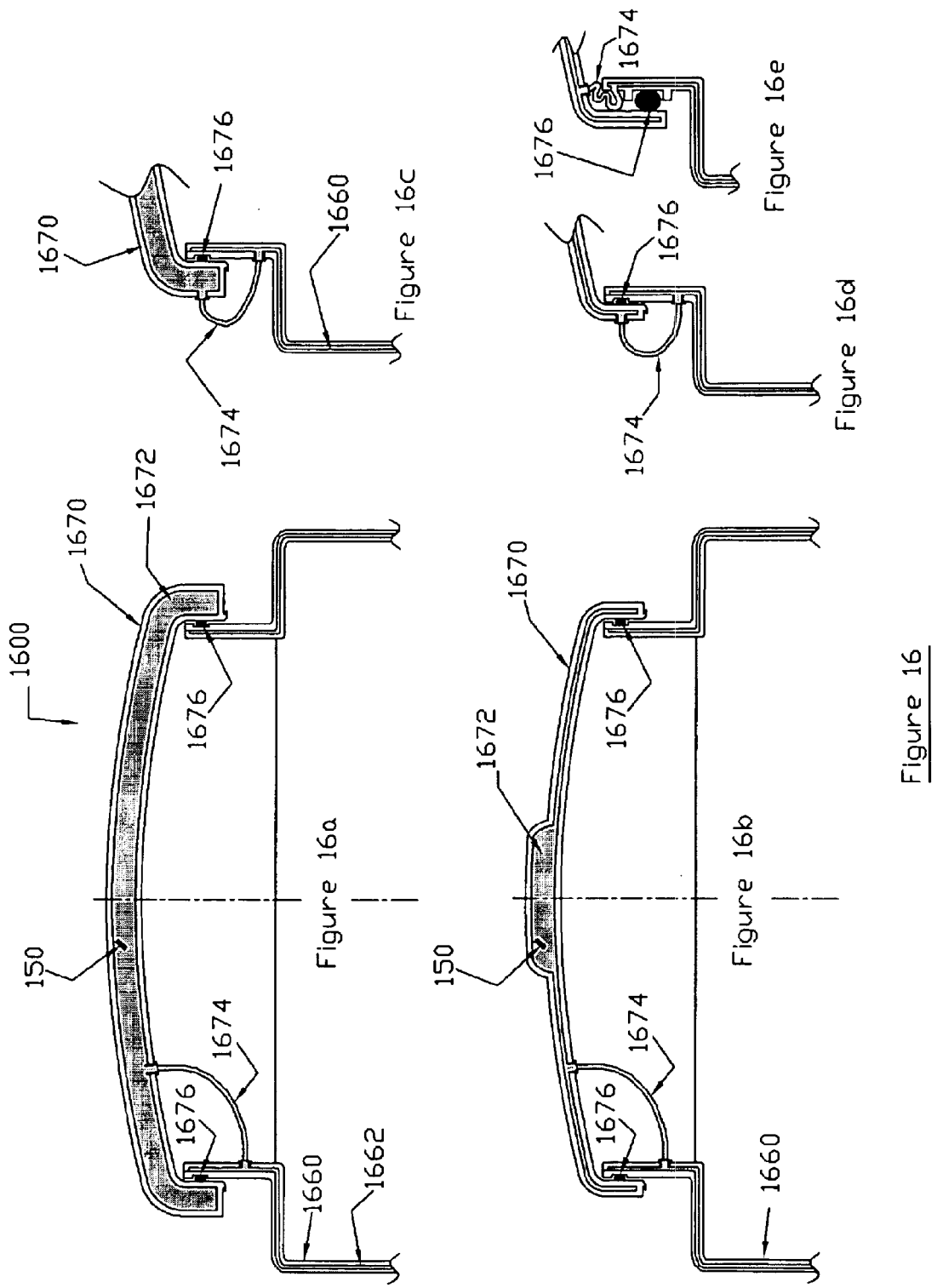
FIG. 16 is a partial view of another exemplary containment enclosure of the invention, showing another embodiment of the invention that includes a lid having a lid monitoring space and different coupling means to integrate the lid monitoring space with a body monitoring space of the containment enclosure's body.

FIG. 16 is a partial view of another exemplary containment enclosure of the invention, showing another embodiment of the invention that includes a lid having a lid monitoring space and different coupling means to integrate the lid monitoring space with a body monitoring space of the containment enclosure's body.

Containment enclosure 1600 includes lid 1670 and body 1660. Lid 1670 includes lid monitoring space 1672 and body 1660 includes body monitoring space 1662. Lid monitoring space 1672 can extend the full length of lid 1670 as shown in the upper figure, or it can have a smaller extent (e.g., near the middle of lid 1670) as indicated on the lower figure.

Sensor 150 can be placed in lid monitoring space 1672 or body monitoring space 1662. Lid monitoring space 1672 has fluid communication with body monitoring space 1662. The fluid communication is made possible by hose 1674 (see FIGS. 16*a*, 16*b*, 16*c*, 16*d*, and 16*e*). Hose 1674 can be placed within containment enclosure 1600 (see FIGS. 16*a*, 16*b*, and 16*e*) or outside of it (see FIGS. 16*c* and 16*d*). Gasket 1676 or other suitable means, including O-rings and the like, can be used to provide seal between lid 1670 and body 1660.

One or more valves (not shown) can be used to shut off fluid communication between lid monitoring space 1672 and body monitoring space 1662 or along hose 1674. These valves, if used, enable disconnection of hose 1674 or separation of lid 1670 from body 1660 without losing gas, liquid, or disturbing vacuum or air pressure in one or both of between lid monitoring space 1672 and body monitoring space 1662.

Figure 17:
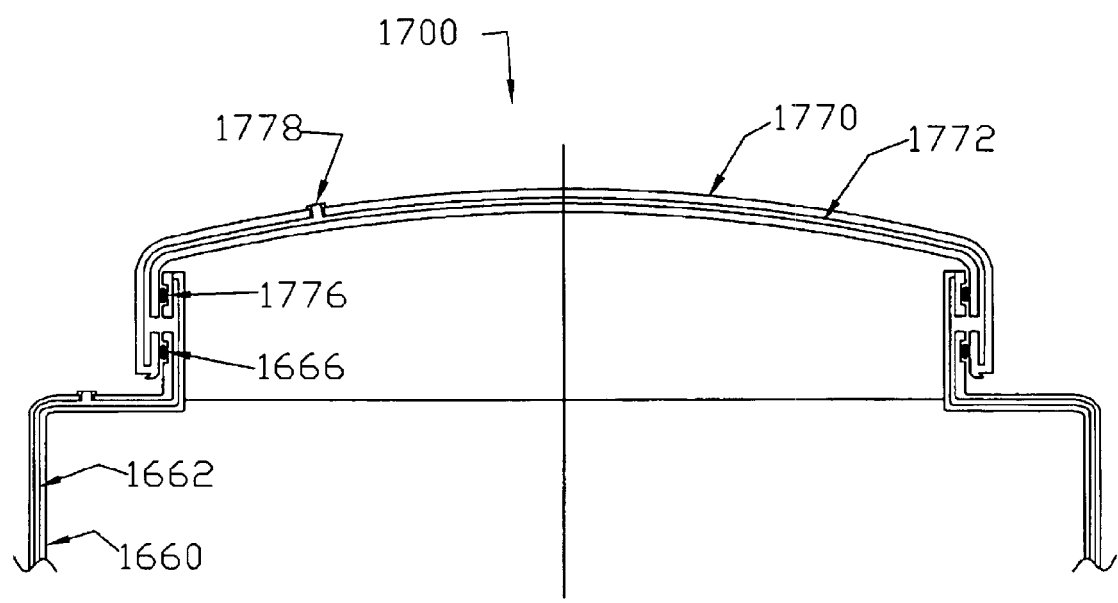
FIG. 17 is a partial view of another exemplary containment enclosure of the invention, showing another embodiment of the invention that includes a lid having a lid monitoring space and an exemplary means to integrate the lid monitoring space with a body monitoring space of the containment enclosure's body.

FIG. 17 is a partial view of another exemplary containment enclosure of the invention, showing another embodiment of the invention that includes a lid having a lid monitoring space and an exemplary means to integrate the lid monitoring space with a body monitoring space of the containment enclosure's body. Containment enclosure 1700 includes lid 1770 and body 1660, which are associated with lid monitoring space 1772 and 1662, respectively. When lid 1770 is in a closed position as shown in FIG. 17, lid monitoring space 1772 has fluid communication with body monitory space 1662. Gaskets 1666 and 1776 provides seal to provide integrity of lid monitoring space 1772 and body monitory space 1662.

Figure 18:
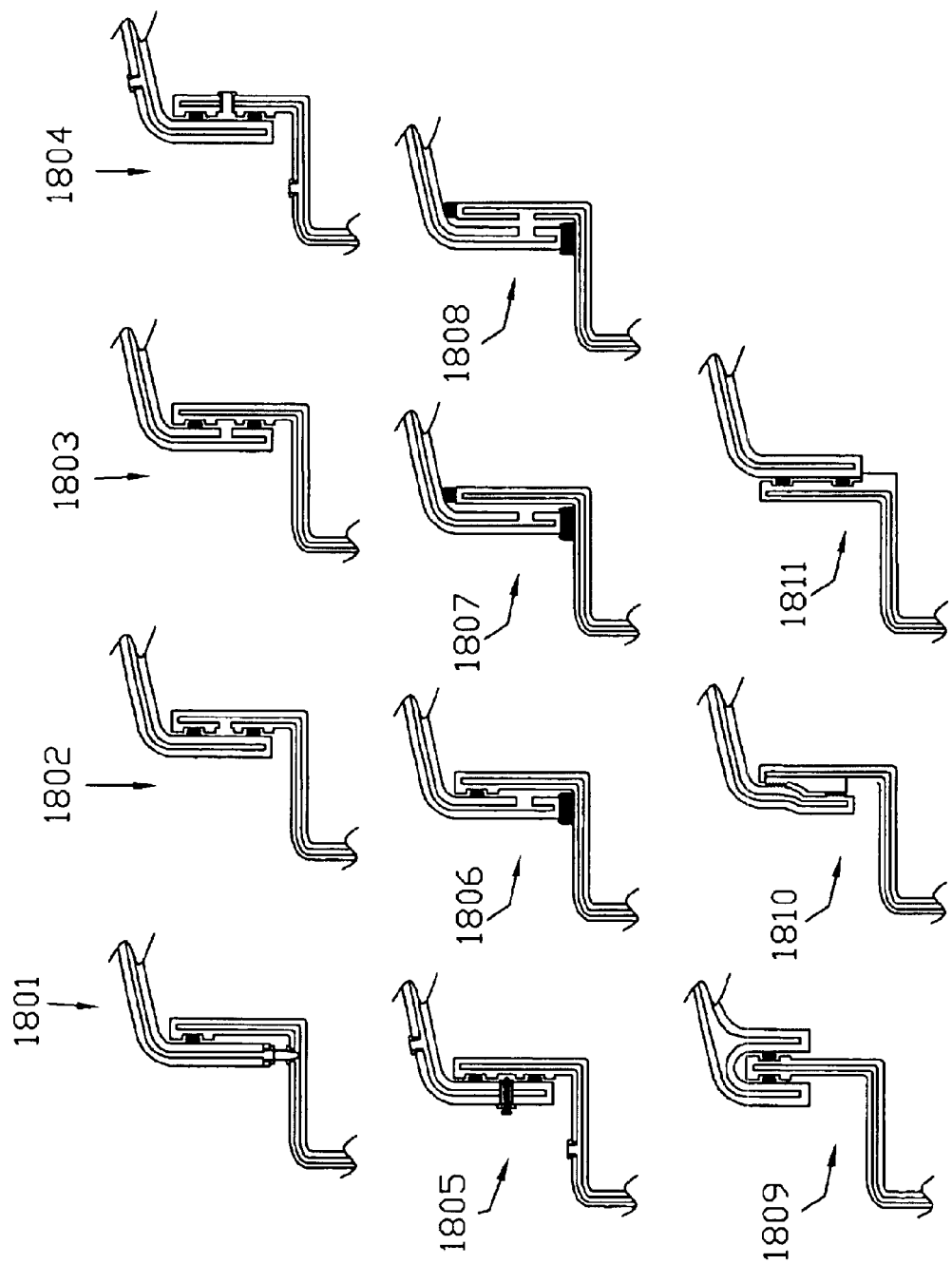
FIG. 18 shows different configurations on how a lid can be coupled to a body of an exemplary containment enclosure of the invention.

FIG. 18 shows different configurations on how a lid can be coupled to a body of an exemplary containment enclosure of the invention. Systems 1801 through 1811 are eleven exemplary systems that can be used to control fluid communication between lid 1770 and body 1660.

Figure 19:
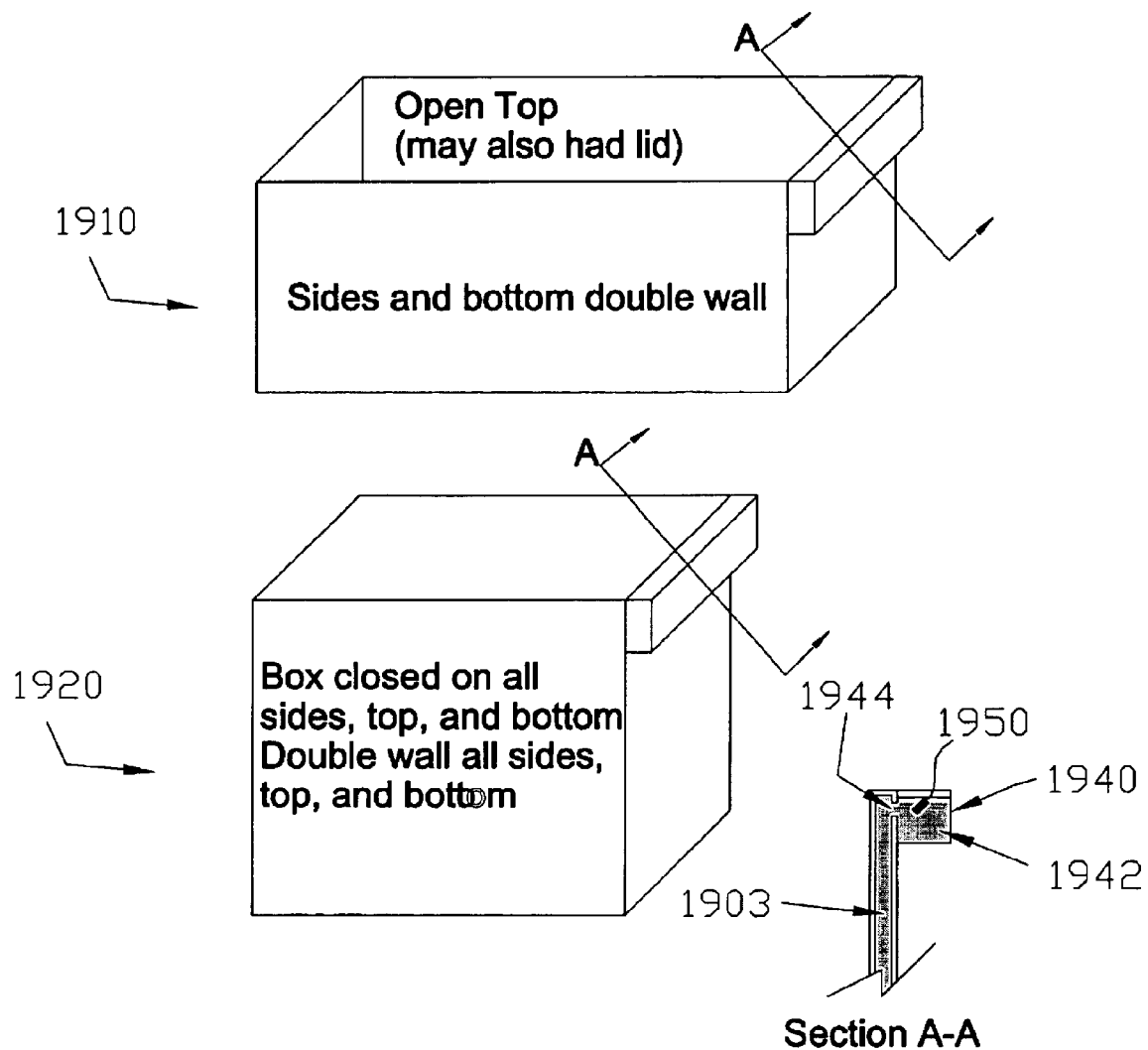
FIG. 19 shows how an exemplary reservoir of the invention can be configured on a containment enclosure.

FIG. 19 shows how an exemplary reservoir of the invention can be configured on a containment enclosure. FIG. 19 shows two exemplary containment enclosures. Containment enclosure 1910 includes a bottom wall and four side walls. Each of the bottom and side walls includes an inner wall and an outer wall that define monitoring space 1903 (see section A—A). Containment enclosure 1910 has an open top. The open top can be configured to receive a lid or cover. Containment enclosure 1920 includes a bottom wall and four side walls. In addition, containment enclosure 1920 further includes a top wall. Each of the top, bottom, and side walls includes an inner wall and an outer wall that define monitoring space 1903.

Each of containment enclosures 1910 and 1920 can be configured to include reservoir 1940 and sensor 1950. Fluid 1942 within reservoir 1940 can flow freely into monitoring space 1903 via one or more holes 1944 that provides fluid communication between reservoir 1940 and monitoring space 1903. Sensor 1950 is configured to monitoring fluid 1942. For example, sensor 1960 can be configured to detect the level of fluid 1942 within reservoir 1940, thereby detecting any leak associated with monitoring space 1903.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be further understood by the numbered exhibits appended hereto, and by their equivalents.

What is claimed is:

1. A containment enclosure comprising:
    a collar portion configured to be attached to a vessel, wherein the collar portion comprises a collar monitoring space defined by an inner wall and an outer wall of the collar portion;
    a top portion configured to be coupled to the collar portion, wherein the top portion comprises a top monitoring space defined by an inner wall and an outer wall of the top portion, wherein the top monitoring space is in fluid communication with the collar monitoring space to form an integrated monitoring space;
    a reservoir in fluid communication with integrated monitoring space; and
    a sensor configured to monitor fluid movement in the integrated monitoring space.

2. The containment enclosure of claim 1, wherein the reservoir is located near an upper extremity of the top portion.

3. The containment enclosure of claim 1, wherein the top portion is coupled to the collar portion during field installation.

4. The containment enclosure of claim 1, further comprising an extension portion, wherein the extension portion is configured to be coupled to the top portion and the collar portion, separating the top portion from the collar portion, wherein the extension portion comprises an extension monitoring space defined by an inner wall and an outer wall of the extension portion, wherein the extension monitoring space is in fluid communication with the top monitoring space and the collar monitoring space, wherein the integrated monitoring space includes the extension monitoring space.

5. The containment enclosure of claim 4, wherein the extension portion is coupled to the collar portion and the top portion during field installation.

6. A containment enclosure for mounting to a tank comprising:
    a collar portion having a collar monitoring space defined by an inner wall and an outer wall of the collar portion, wherein the collar portion is configured to be coupled to the tank;
    an extension portion having an extension monitoring space defined by an inner wall and an outer wall of the extension portion, the extension portion is configured to be coupled to the collar portion;
    a top portion having a top monitoring space defined by an inner wall and an outer wall of the top portion, wherein the top portion is configured to be coupled to the extension portion;
    a reservoir coupled to the top portion, wherein the reservoir is in fluid communication with the top monitoring space, the extension monitoring space, and the collar monitoring space;
    a fluid flowing freely within the reservoir, the top monitoring space, the extension monitoring space, and the collar monitoring space; and
    a sensor configured to monitor movement of the fluid in the reservoir, the top monitoring space, the extension monitoring space, and the collar monitoring space.

7. The containment enclosure of claim 6, wherein the top portion has a flat top shape.

8. The containment enclosure of claim 6, wherein the top portion has a conical top shape.

9. The containment enclosure of claim 6, wherein one or more of the top portion, the extension portion, and the collar portion have a round cross section.

10. The containment enclosure of claim 6, wherein one or more of the top portion, the extension portion, and the collar portion have a polygonal cross section.

11. The containment enclosure of claim 6, wherein one or more of the top portion, the extension portion, and the collar portion have an elliptical cross section.

12. The containment enclosure of claim 6, further comprising a lid having a lid monitoring space, wherein the lid monitoring space is configured to have fluid communication with the top monitoring space.

* * * * *